United States Patent [19]
Berman et al.

[11] 3,925,679
[45] Dec. 9, 1975

[54] MODULAR OPERATING CENTERS AND METHODS OF BUILDING SAME FOR USE IN ELECTRIC POWER GENERATING PLANTS AND OTHER INDUSTRIAL AND COMMERCIAL PLANTS, PROCESSES AND SYSTEMS

[75] Inventors: Paul A. Berman, Plymouth Meeting; Theodore C. Giras, Pittsburgh; Roy E. Crews, Allison Park, all of Pa.

[73] Assignee: Westinghouse Electric Corporation, Pittsburgh, Pa.

[22] Filed: Sept. 21, 1973

[21] Appl. No.: 399,582

[52] U.S. Cl. ............................ 290/1; 52/79; 52/122; 52/745
[51] Int. Cl.² ........................................ B65D 85/00
[58] Field of Search ............ 52/74 S, 79, 143, 122; 290/1, 40, 52

[56] References Cited
UNITED STATES PATENTS
3,489,911  1/1970  Varner et al. ............... 290/40 X
3,848,138  11/1924  Park ............................. 290/40

*Primary Examiner*—G. R. Simmons
*Attorney, Agent, or Firm*—E. F. Possessky

[57] ABSTRACT

Modular operating centers for use in electric power generating plants and other industrial and commercial plants, processes and systems are constructed by using a novel prefabricated modular technique. This technique includes loading a plurality of transportable room-size building modules with control system equipment at a factory site. Typically, the control system equipment includes sophisticated and complex electrical and electronics data processing and control equipment. The control system equipment is installed and bolted down in the different building modules and the equipment in each module is inter-wired at the factory site. Temporary inter-module connections are established between the control system equipment in different ones of the building modules and such equipment, as a whole, is then thoroughly tested and adjusted under simulated use conditions. Thereafter, the loaded and tested building modules are separated and separately transported to the industrial or commercial installation site. At the installation site, the building modules are joined together to form an integral weatherproof building structure and the inter-module control system equipment connections are re-established to provide a tested and substantially ready-to-go control center for the plant, process or system in question. A novel feature of this technique is that structural building modules are used as the shipping containers for transporting complex electrical and electronics equipment to the final installation site.

36 Claims, 15 Drawing Figures

MODULAR OPERATING CENTERS AND METHODS OF BUILDING SAME FOR USE IN ELECTRIC POWER GENERATING PLANTS AND OTHER INDUSTRIAL AND COMMERCIAL PLANTS, PROCESSES AND SYSTEMS

BACKGROUND OF THE INVENTION

This invention relates to operating centers for monitoring and/or controlling the operation of plants, processes and systems of an industrial or commercial nature and to methods of building such operating centers. Though not limited thereto, the present invention is particularly useful in connection with electric power generating plants and stations.

Various industrial and commercial plants, processes and systems employ operating centers which are equipped with various instruments and mechanisms for monitoring or controlling the operation of the plant, process or system or a major portion thereof. Where control functions are involved, such functions may be automatic, semi-automatic or manual in nature. Typically, the operating center receives a relatively large number of signals and messages indicating various conditions at various points in the plant, process or system. These signals and messages are processed at the operating center and the intelligence gained therefrom is used to evaluate and, where appropriate, to modify or alter the operation of the plant, process or system or, in the case of some types of systems, the status or condition of objects which are influenced or affected by the system. Typically, such operating centers employ rather complex electrical and electronics equipment for processing the incoming signals and transmitting the appropriate information and instructions to other parts of the plant, process or system. For the more sophisticated applications, such control equipment frequently includes various digital data processing and digital computer equipment.

Examples of plants, processes and systems which may employ operating centers of the foregoing type are: electrical power generating plants, chemical plants, oil refineries, sewage treatment plants, electrical power transmission systems, pipeline transportation systems, railroad systems, aircraft traffic control systems, telephone systems, radio communications sytems, data processing systems and weather forecasting systems. These examples represent only a few of the more common situations in which operating centers are employed and the foregoing is not intended to be a complete listing of all such situations.

In the past, operating centers which employ complex electrical and electronics equipment have typically been constructed by first erecting at the industrial or commercial installtion site a suitable building structure for housing the electrical and electronics equipment. After the operating center building is erected, the various cabinets, panels and other units which contain the electrical and electronics equipment are transported to the installation site and installed in the operating center building. After the various cabinets, panels and other units are properly mounted and bolted down, they are then inter-wired and interconnected with one another to form a complete set of control system equipment within the operating center building. The control system equipment is thereafter tested to determine that all the proper interconnections have been made and that the equipment is operating as desired. Any necessary adjustments or calibrations of the equipment are made at this time.

With complex electrical and electronics equipment, a considerable amount of inter-wiring and testing is normally required. As a consequence, the on-site installation time is rather lengthy and a considerable amount of labor and effort is expended at the installation site. Also, where the operating center is installed at a rather remote location or in a relatively harsh environment, the installation and testing is frequently done under less than ideal conditions.

In contrast thereto, the present invention employs prefabrication and modular construction techniques which reduces the on-site installation time and cost to a minimum. Such techniques enable the extensive inter-wiring and testing of the control system equipment to be done under more ideal and efficient conditions at a properly equipped and properly staffed manufacturing location or factory site. Such techniques enable the realization of prepackaged and pretested modular operating centers which can be installed and made ready to go in much less time and which much less expenditure of labor at the installation site.

The present invention is of particular significance in connection with the construction of large scale electric power generating plants of the kind used by electric utility companies for generating the electricity supplied to their various residential, commercial and industrial customers. Such power plants typically have a power generating capacity on the order of several hundred megawatts or more. In the past, it has typically taken somewhere on the order of four or five years of more from the time a utility company decides to build a new non-nuclear steam type power plant until the time the plant is completed and operating to produce electricity. This represents a rather substantial lead time. And it is even longer for the case of nuclear type power plants.

Applicants, however, are involved in the planning and implementation of a new pre-packaged modular approach to the construction of utility company power plants which will, in most cases, reduce this lead time to one-third or less of its previous value. This approach offers substantial reductions in construction costs. It also offers a faster solution to the present day problem of increasing energy shortages.

A significant factor in reducing the power plant construction time and cost results from the use of the present invention to reduce the time and cost involved in constructing, equipping, and putting into operation the operating center or control center which controls or runs the plant. In most cases, the operating center, complete with pre-installed and pre-tested control system equipment, can be delivered within about 12 months after order acceptance and it is possible, as far as the control system is concerned, to have the plant on line and producing electricity within 6 weeks after installation of the operating center building. Thus, the present invention contributes very substantially to the solution of a real and pressing problem in the electric utility industry.

Prefabricated and modular construction techniques have been heretofore used in various fields of endeavor, particularly in the residential housing field where such techniques have been used in the construction of residential dwellings and apartment buildings. Some very general aspects of these prior techniques are employed in connection with the present invention. Consequently, it is helpful by way of background information to consider some of the more pertinent prior art patents relating to the prefabricated and modular construction of building structures.

One of the earlier patents in this area is U.S. Pat. No. 1,995,573 granted to S. G. Matthews on Mar. 26, 1935 for a "Portable Building Unit." The Matthews patent describes the use of portable room-size building modules in constructing multi-unit single-story and multi-unit multi-story residential type building structures.

Another prior art patent is U.S. Pat. No. 2,795,014 granted to M. J. Kelly on June 11, 1957 for a "Complete Factory Produced Dwelling." The Kelly patent describes the construction of a one story residential dwelling by means of three factory produced transportable building modules which are hauled to the installation site and joined together to form the complete dwelling.

U.S. Pat. No. 3,103,709 granted to H. C. Bolt on Sept. 17, 1963 for "Building Structures" describes a collapsible type building unit which is hauled to the installation site in a collapsed condition. At the installation site, the unit is opened up and erected to form a room-size building structure. Several such erected structures can be joined together in a side-by-side fashion to provide an overall structure having a relatively large floor area.

U.S. Pat. No. 3,256,652 granted to C. Van Der Lely on June 21, 1966 for a "Building of Assembled Box-Shaped Elements" describes the use of a number of room-size box-shaped modules which are joined together at the installation site to form a residential type dwelling.

U.S. Pat. No. 3,461,633 granted to R. L. Ziegelman et al on Aug. 19, 1969 for a "Prefabricated Building Structure" describes the use of a plurality of room-size box-shaped building modules which are joined together at the installation site to form a complete building structure. Certain general aspects of the Ziegelman construction are employed in connection with the preferred embodiment of the present invention.

U.S. Pat. No. 3,540,173 granted to S. Jonnides on Nov. 17, 1970 for "Expandable, Transportable, Prefabricated Containerized Buildings" describes the use of box-shaped building modules wherein a first module includes a plurality of hinged panels which may be unfolded at the installation site to form a second module of the same size as the first module.

U.S. Pat. No. 3,609,929 granted to R. B. Brown et al on Oct. 5, 1971 for a "Prefabricated Building" describes the use of a plurality of C-shaped half modules or half boxes which can be transported to the installation site and joined together in various configurations to form multi-story residential type buildings.

U.S. Pat. No. 3,643,389 granted to W. S. Sheppley, Jr. on Feb. 22, 1972 for a "Modular Electrical Enclosure" describes the construction of a data processing center using a modular frame type of construction. Such data processing center is designed to house complex electrical and electronics data processing equipment.

U.S. Pat. No. 3,680,273 granted to F. E. Bigelow, Jr. on Aug. 1, 1972 for "Assembly of Collapsed Buildings for Shipping" describes the use of collapsible type room-size units which are opened up and joined together at the installation site to form a complete residential type structure. The customary residential type electrical wiring is installed in the wall panels of the individual units prior to shipment to the installation site.

With the exception of the Sheppley, Jr. patent, none of these prior art prefabricated building construction patents describe a building structure which was specifically intended for use in housing complex electrical and electronics equipment. While the Sheppley, Jr. patent does describe such a building structure, the modular technique described therein does not eliminate the need for the tedious and time consuming on-site installation and inter-wiring of the individual electrical and electronics equipment units in the building structure.

Another class of prior art which appears to be relevant to the present invention is represented by the apparatus described in a magazine article entitled "Megawatts On Wheels" and written by Messrs. C. E. Thompson, C. R. Boland and E. Burnstein. This technical article appeared in the March 1971 issue of Combustion at pages 24–30 thereof. This technical article describes a mobile electrical power generating plant which employs a pair of truck type tractor-trailer units. One trailer unit houses a gas turbine and electrical generator, while the other trailer unit houses the control panel, circuit breakers, voltage regulators, fuel controls and the like for the tubine and generator. This mobile power plant is intended primarily for emergency use. The trailers are hauled to the point of need and are deployed and connected up to the transmission lines of the diabled power system. Cables are run between the two trailer units to connect the gas turbine and generator in the first trailer to the control panel and other equipment in the second trailer. Thereafter, the gas turbine is started and the mobile power station supplies the needed electric power to the disabled power system.

A somewhat different type of mobile electrical equipment unit is described in U.S. Pat. No. 3,652,806 granted to N. Nakagami et al on Mar. 28, 1972 for "Transportable Telephone Exchange Apparatus." The Nakagami et al patent describes a mobile telephone exchange which is housed in a truck trailer and which may be hauled to a disaster area or other area to provide a temporary telephone exchange.

The "Megawatts on Wheels" article and the Nakagami et al patent show that certain types of electrical and electronics systems have been heretofore arranged to be transported by truck trailers. This form of transportation can also be used in connection with the present invention. More particularly, the building modules used in the preferred embodiment of the present invention are designed so that they can, if desired, be transported by truck trailers. This technical article and this prior art patent, however, do not relate to the problem of constructing stationary type operating centers of control centers intended for long tem use at a fixed location and, hence, fail to suggest the herein described novel solution to such problem.

The issued patents and the technical article discussed above were found during the course of a prior art investigation of reasonable scope and effort. They represent what applicants presently consider to be the best of the prior art presently known to them. No representation is made or intended, however, that better prior art does not exist. Nor is any representation made or intended that the foregoing interpretations are the only interpretations that can be places on these patents and this technical article.

As used in the present specification and claims, the term "operating center" is intended to include: (1) control center having only control apparatus for controlling the operation of the plant, process or system; (2) data monitoring and data logging centers having only data display, data read-out and recording type apparatus for providing visual, graphical and/or printed information concerning the operation of the plant, process or system; and (3) centers having both control and monitoring apparatus for providing both types of functions. Also for purposes of the present specification and claims, the term "control system equipment" is intended to include any of the various types of apparatus commonly associated with control systems and, as such, includes either control apparatus or monitoring apparatus or both.

BRIEF DESCRIPTION OF THE DRAWINGS

For a better understanding of the present invention, together with other and further advantages and features thereof, reference is had to the following description taken in connection with the acompanying drawings, in which.

GENERAL DESCRIPTION OF THE PREFERRED METHOD

Figure 1:
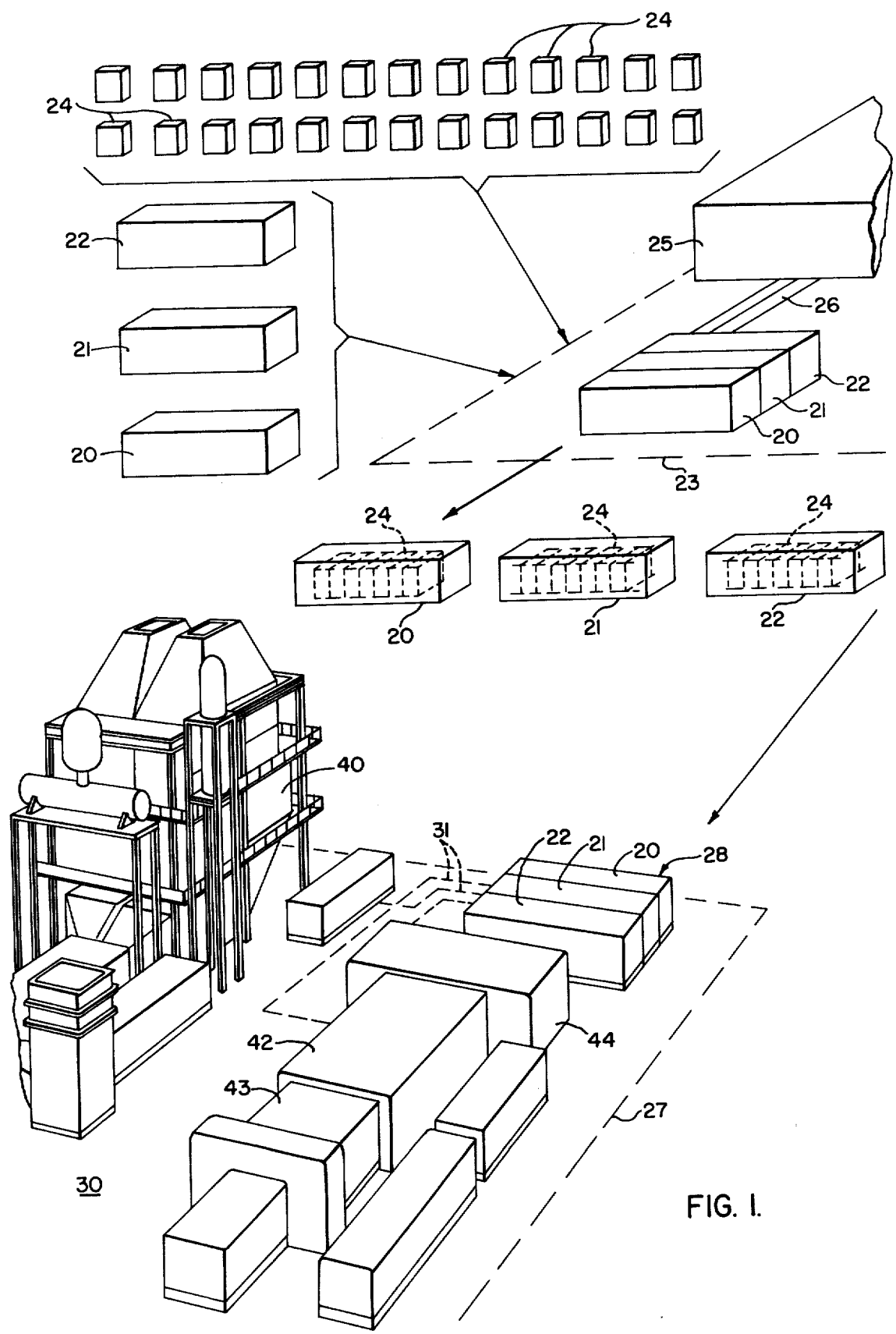
FIG. 1 illustrates in a diagrammatic manner the general features of a method of building an operating center in accordance with the present invention.

Referring to FIG. 1, there is shown in a generalized schematic manner a method of building an operating center in accordance with the present invention. FIG. 1 shows the case where the operating center is used for controlling an electric power generating plant. As indicated, this is a particularly significant application of the present invention. It should be borne in mine, however, that the present invention is also applicable to the building of operating centers and electronics centers for a variety of other plants, processes and systems of an industrial or commercial nature. Also, the overall size and shape of the ultimate operating center building shown in FIG. 1 is intended only as an example. As will be seen hereinafter, the teachings of the present invention can be used to construct operating center buildings of various sizes and shapes. Also, while FIG. 1 shows the case where three building modules are used to form a complete building, it should be understood that the number of modules can be varies to suit the particular application at hand. If a bigger building is needed, more modules are used. If a smaller building is sufficient, fewer modules are used.

As shown in FIG. 1, a plurality of transportable room-size building modules 20, 21 and 22 are located at a factory site 23. The building modules 20, 21 and 11 constitute structural parts of a unitary operating center building. Their construction is such that when joined together they form a complete integral weatherproof building structure. As will be described further herein, each of the building modules 20, 21 and 22 includes a rectangular metal frame structure and permanent closure panels secured to and closing each side of the module that will not abut another module in forming the complete operating center building. Each building module is preferably of room-size dimensions such that it can house the desired control system equipment and so that, in addition thereto, a human being can readily move about therein. The dimensions of each module preferably are also such that it can be transported by a truck-type motor vehicle if desired. Each of the building modules 20, 21 and 22 may have, for example, an overall length of 40 feet, an overall width of 12 feet and an overall height of 10 feet (excluding support legs, if any).

The building modules 20, 21 and 22 may be constructed at the factory site 23 or, in the alternative, may be constructed at some other location and transported to the factory site 23. In either case, the three building modules 20, 21 and 22 are temporarily positioned adjacent one another at the factory site 23 in much the same manner in which they will ultimately be joined together at the industiral or commercial installation site. If desired, they may be temporarily physically fastened to one another and the joints therebetween temporarily weatherproofed.

Also located at the factory site 23 is various operating equipment represented by a number of discrete or separate equipment units 24. Such units 24 may be manufactured at the factory site 23 or may be manufactured elsewhere and transported to the factory site or some of the units 24 may be manufactured at the factory site 23 and some elsewhere. In the present embodiment, this operating equipment 24 takes the form of electrical and electronics type control system equipment. As such, each of the units 24 may take the form of, for example, a cabinet structure or a rack structure which houses or holds various electrical and electronics components such as electronic circuits, electrical instruments and devices, printed circuit card frames and cards, digital computer hardware, digital data handling devices, data recording and display devices, alarm devices and the like.

At the factory site 23, the electrical equipment units 24 are loaded into the building modules 20, 21 and 22, some of the electrical equipment units 24 being installed in the building module 20, some in the building module 21 and the remainder in the building module 22. Each of the equipment units 24 is preferably bolted down or otherwise secured within its particular building module so that it will remain at a fixed location therein. The electrical equipment units 24 installed in the building module 20 are thereafter interwired with one another, as are the electrical equipment units 24 installed in the building module 21 and the units 24 installed in the building module 22. Thus, the control system equipment 24 in each building module is placed as nearly as possible in its ultimate use condition from a mounting and inter-wiring standpoint.

At the factory site 23, inter-module electrical connections are also established between the control system equipment units 24 in different ones of the building modules 20, 21 and 22. This is accomplished by means of electrical cables having quick connect/disconnect type connectors at the ends thereof. These inter-module connections are such that the control system equipment 24, as a whole, is completely interconnected in its ultimate use condition.

The control system equipment 24 installed in the building modules 20, 21 and 22 is then thoroughly tested at the factory site 23. This testing includes the combined testing of the equipment interconnected by the inter-module connections. More particularly, the installed control equipment 24 is preferably connected to a test facility located in a building 25 at the factory site 23 and the control system equipment 24 as a whole is systems tested under simulated use conditions. All major and, if desired, minor control equipment adjustments are preferably made during the course of such testing at the factory site 23.

The control system equipment 24 is connected to the test facility in building 25 by means of electrical cables 26 which preferably duplicate in number and function the cables that will eventually run from the operating center building to the other parts of the plant, process or system at the ultimate installation site. Such cables 26 are connected to one or more control cable connector panels within one of the building modules 20, 21 and 22, which connector panels will be used at the industrial or commercial installation site to connect the control system equipment 24 to the remainder of the plant, process or system.

The test facility within the building 25 includes suitable electrical circuits and devices for performing various static and continuity type tests on the control system equipment 24. For example, the test facility in building 25 includes means for placing on various cable conductors 26 signals representing alarm conditions in the actual plant, process or system. A determination is then made to see of the appropriate alarms are actuated within the control system equipment 24.

The test facility in building 25 further preferably includes electrical and electronic circuits and devices which electrically simulate the actual plant, process or system to be controlled. These test circuits respond to signals from the control system equipment 24 to send back to such control system equipment 24 signals representing the plant conditions that would be encountered as a result of the previous and present settings of the control system equipment 24. This enables a dynamic testing to be performed on the control system equipment 24. Such dynamic testing may vary in scope. For example, it may be either total or partial, that is, the dynamic responses for either the total plant or only a selected portion of the plant may be tested.

For maximum efficiency and flexibility, the test facility in building 25 preferably includes a programmable digital computer which is properly programmed to process the incoming control signals and to automatically send back the appropriate plant conditon signals for simulating to as great a degree as possible the dynamic operation of the actual plant, process or system being controlled. The program that is used to run this test facility digital computer is basically a computer model of the plant, process or system to be controlled, defined in terms of the input and output signals seen by the control system equipment 24. All sequencing functions are modeled, as well as the dynamics of the plant, process or system condition sensor devices. In other words, all sensor outputs are modeled and actions are taken for all control or actuating signals from the control system equipment 24. Failure of sensors and actuators are also simulated.

After the control system equipment 24 installed in the building modules 20, 21 and 22 has been thoroughly tested and adjusted and any malfunctions corrected, the loaded building modules are prepared for transportation to the industrial or commercial installation site. Such preparation for transportation includes disconnecting the inter-module electrical equipment connections between the different building modules 20, 21 and 22 and, if temporarily fastened together, the physical unfastening of the building modules 20, 21 and 22 from one another. Temporary closure means in the form of, for example plywood panels, are then secured in place so as to close off the open sides of the building modules 20, 21 and 22, such open sides being the ones that will abut an adjacent module in forming the complete building structure.

Thereafter, the loaded building modules 20, 21 and 22 are transported to the industrial or commercial installation site which, in the FIG. 1 embodiment, is represented by installation site 27. The loaded building modules may be transported by means of truck-type tractor-trailer motor vehicles, railroad flat cars, river barges or, in the case of overseas installation sites, by oceangoing freighters and the like. Where appropriate, more than one form of transportation may be used during the course of the journey to the installation site. For the case of transportation by tractor-trailer motor vehicles, for example, each of the loaded building modules 20, 21 and 22 is loaded onto the trailer of a different tractor-trailer unit. For the illustrated case of three building modules, the three tractor-trailer units would then haul the three building modules over the public highways and other roadways to the final installation site.

At the installation site 27, the loading building modules 20, 21 and 22 are installed so as to form at least part of the structure of a complete building. In the illustrated embodiment, the three building modules 20, 21 and 22 are joined together to form a complete operating center building 28. This may be acomplished, for example, by lifting the loaded building modules, one at a time, from their respective truck trailers and lowering them into place in a side-by-side relationship on a previously prepared foundation structure. The temporary closure panels are then removed and the three building modules 20, 21 and 22 bolted together to form an integral building structure. The joints between the building modules 20, 21 and 22 are weatherproofed to provide a completely weatherproof structure. The intermodule cable connections between the control system equipment 24 in the different building modules are then reestablished to provide a complete substantially ready-to-go operating center for the plant, process or system located at the installation site 27.

In the described embodiment, the plant, process or system at the installation site 27 takes the form of an electric power generating plant 30. The control system equipment 24 in the operating center building 28 is connected to the turbines, generators, steam generating units and other apparatus employed in the power plant 30 by means of electrical cables 31, which may, for example, be buried underground. After a brief final checkout procedure, the operating center 28 is then ready to commence operating control of the electric power generating plant 30.

As a result of the prepackaging and pretesting of the control system equipment 24, the operating center 28 is installed and made ready to go at the plant site 27 in considerably less time and with considerably less expenditure of plant site labor than would otherwise be the case. Because of the many variables involved, it is difficult to give a figure for the cost savings which will apply in every case. For the three-module electric power plant operating center being considered, the total cost of the on-site and ready-to-go operating center will, in the average case, be on the order of one-half the total cost of an equivalent operating center constructed in accordance with prior practices.

DESCRIPTION OF THE PREFERRED APPARATUS EMBODIMENT

Figure 2:
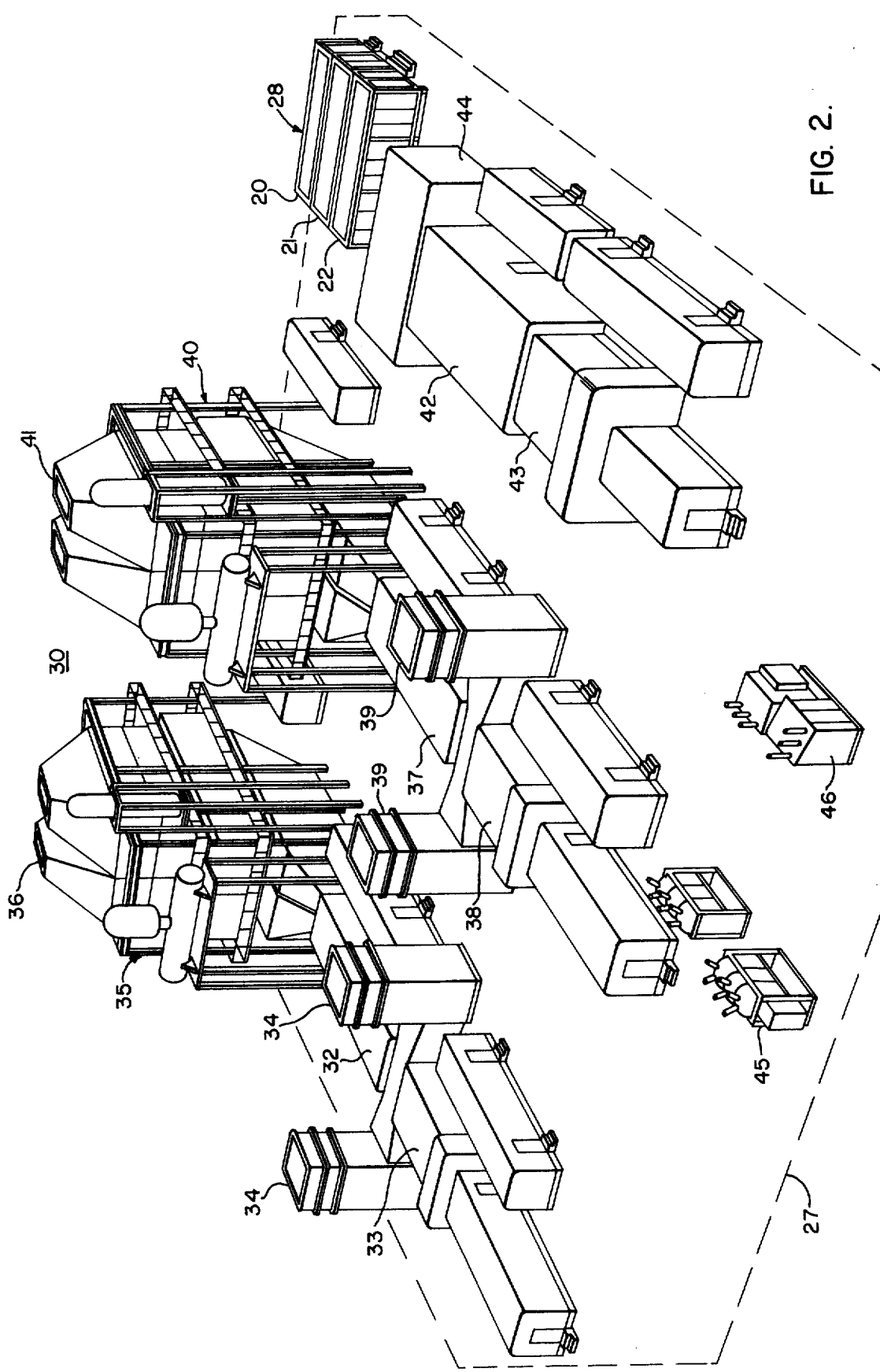
FIG. 2 shows a typical industrial installation site employing an operating center constructed in accordance with the present invention, the illustrated installation site being an electric power generating plant.

Referring to FIG. 2, there is shown in greater detail the industrial installation site 27 of FIG. 1 and the electric power generating plant 30 located thereon. The power generating plant 30 is a combined cycle plant employing both gas and steam turbines. More particularly, the power generating plant 30 includes a first gas turbine 32 which drives a first electric generator 33. Air enters the gas turbine 32 through air intake ducts 34. The hot exhaust gas from turbine 32 is passed through a first heat recovery steam generator 35 and emitted into the atmosphere by way of steam generator stack outlets 36. The power plant 30 also includes a second gas turbine 37 which drives a second electric generator 38. Air enters the gas turbine 37 by way of air intake ducts 39. The hot exhaust gas from the turbine 37 is passed through a second heat recovery steam generator 40 and emitted into the atmosphere by way of steam generator stack outlets 41.

Located within each of the steam generators 35 and 40 are sets of boiler tubes which are used to convert water into superheated steam. This superheated steam is supplied to a steam turbine 42 which drives a third electric generator 43. Spent steam from the steam turbine 42 is converted back into water by a condenser 44 and such water or condensate is thereafter returned to the steam generators 35 and 40 to be converted into steam again. For simplicity of illustration, the steam piping and water piping running between the steam generators 35 and 40 and the steam turbine 42 and condenser 44 have been omitted.

Circuit breakers 45 and other switchgear and power transformers (not shown) are used for connecting the electric generators 33, 38 and 43 to the electrical power transmission system (not shown) being supplied by the power plant 30. The electrical conductor system interconnecting generators 33, 38 and 43, circuit breakers 45, transformer 46 and the transmission system has been omitted for the sake of simplicity.

The power plant operating center building 28 is located at the right rear corner of the installation site 27 in the view of FIG. 2. A large number of underground electrical cables (not shown) run between the operating center building 28 and various condition sensor devices and actuator mechanisms associated with gas turbines 32 and 37, steam turbine 42, electric generators 33, 38 and 43, steam generators 35 and 40 and the various other items of apparatus making up the power generating plant 30. The condition sensors produce signals representative of quantities such as gas turbine combuster shell pressure, gas turbine exhaust temperature, steam and condensate temperatures, pressure and flow rates, steam turbine inlet temperature and pressure, steam generator and condenser fluid levels, electric generator output voltages, currents, r.p.m. and power and various other operating conditions associated with the power generating apparatus. The actuator mechanisms control devices like fuel valves, steam valves, condensate valves, water pumps, oil lube pumps, generator starting motors, standby water heaters and various other operating mechanisms associated with the different parts of the power plant apparatus.

The installation site 27 occupies approximately one acrte of land area. The overall height of the tallest units, namely, the steam generators 35 and 40, is approximately 52 feet or some five stories.

Figure 3:
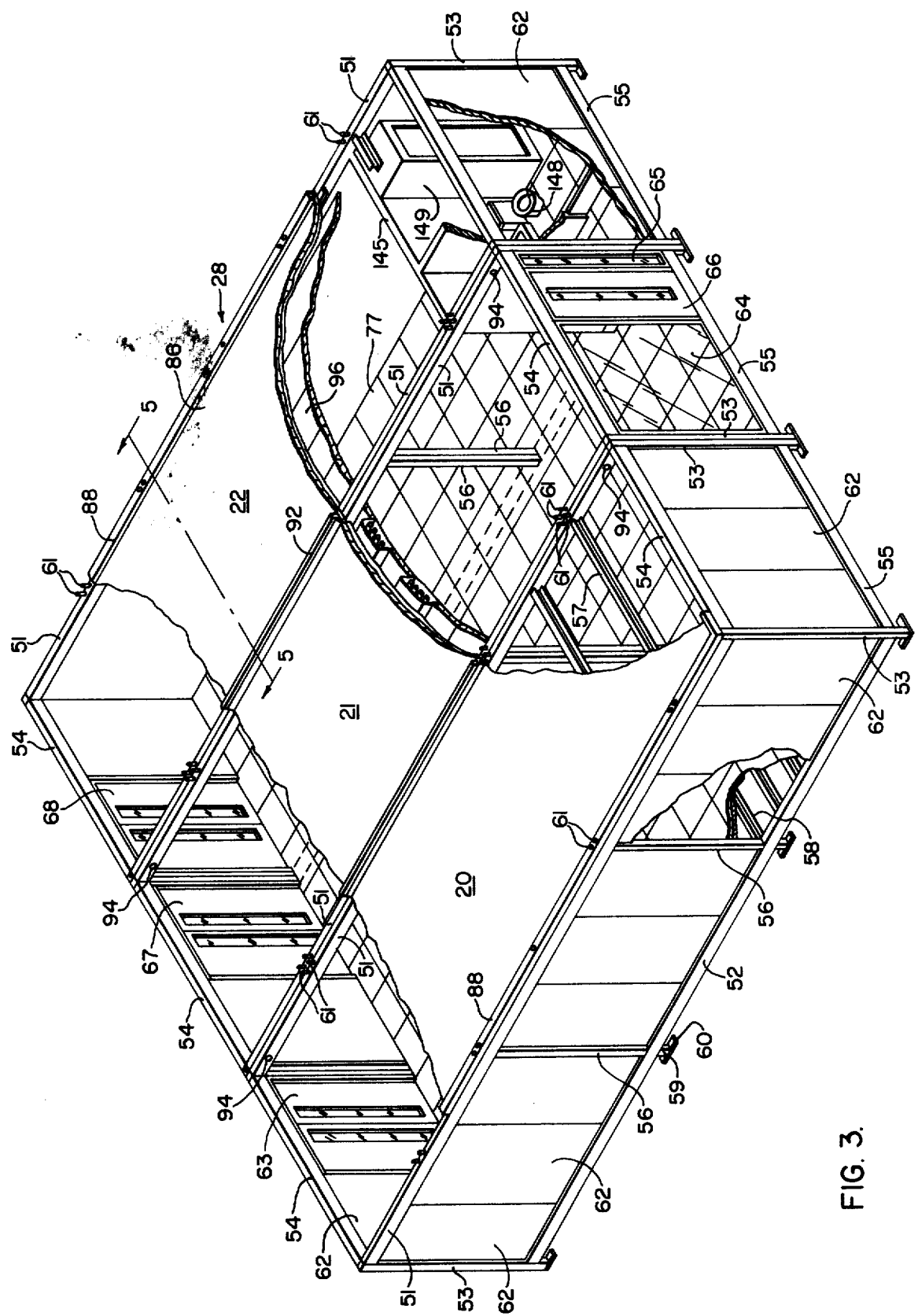
FIG. 3 is an enlarged partially cut away perpective view of the operating center building shown in FIG. 2.
Figure 4:
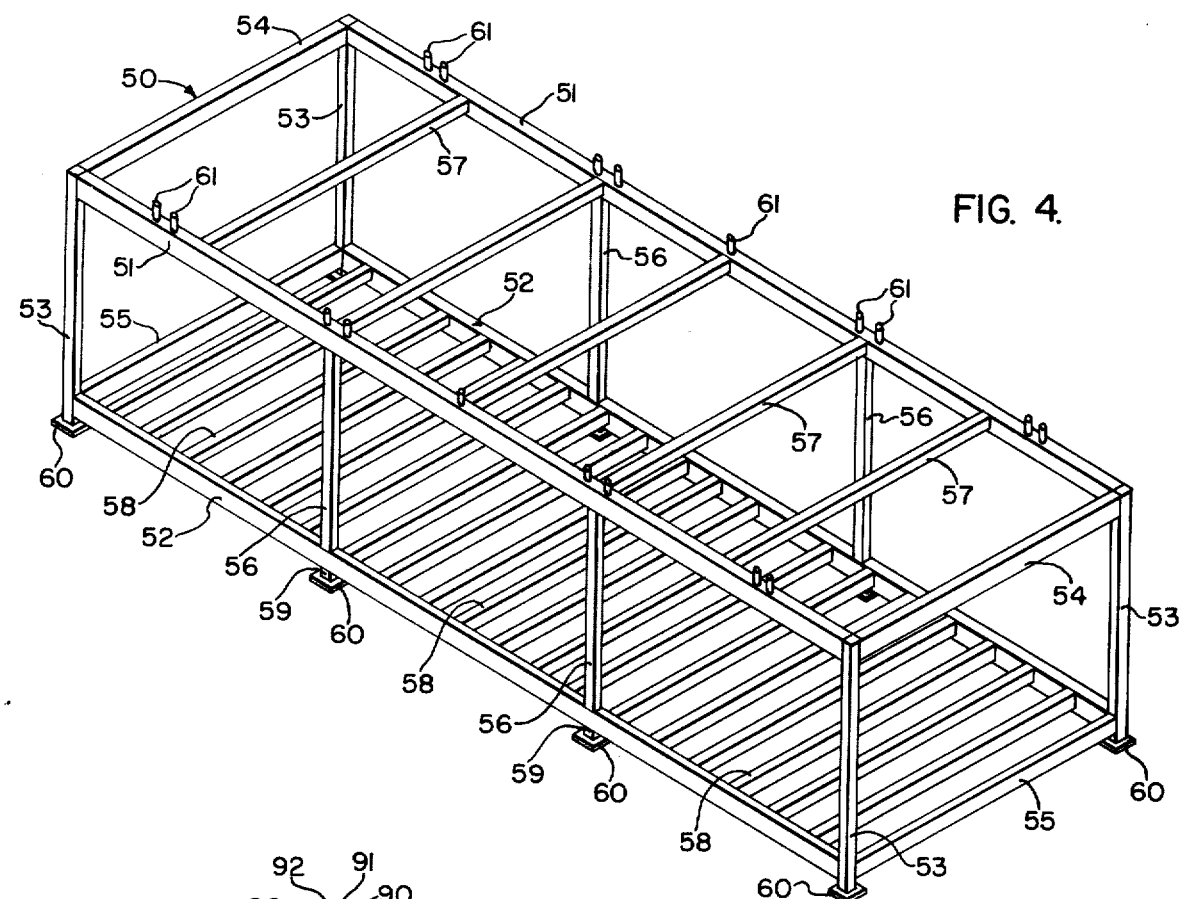
FIG. 4 is a perspective view of the metal frame structure for one of the building modules used in constructing the operating center building of FIG. 3.
Figure 5:
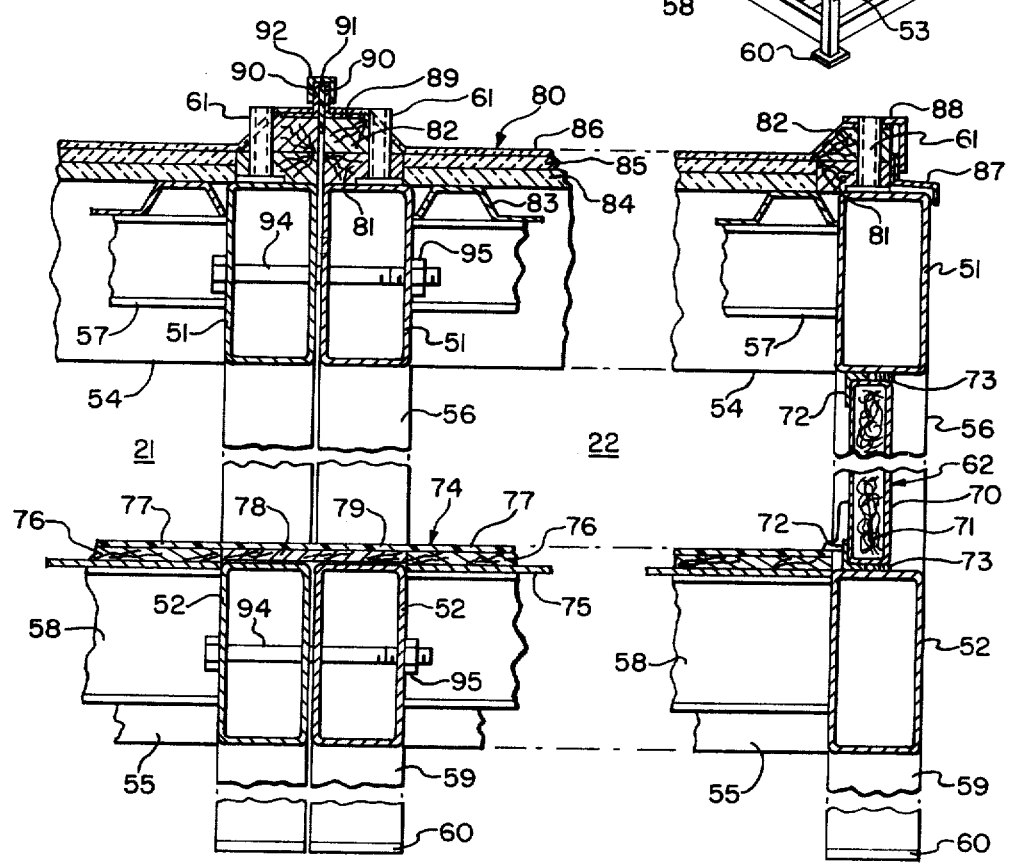
FIG. 5 is an enlarged fragmentary cross-sectional view taken along section line 5—5 of FIG. 3 and showing major structural portions of the FIG. 3 operating center building in a cross-sectional manner.

Referring now to FIGS. 3–5, there is shown in greater detail the preferred physical construction of the operating center building 28. As indicated in FIG. 3, the three building modules 20, 21 and 22 are joined together in an abutting side-by-side manner to form the complete unitary operating center building 28. Each of the building modules 20, 21 and 22 includes a transportable room-size three-dimensional, rectangular, metal frame structure. The frame structures for the three building modules 20, 21 and 22 are of substantially identical construction. The frame structure for one of these building modules is shown in FIG. 4 and identified, as a whole, by reference numeral 50.

The frame structure 50 of FIG. 4 includes a pair of upper longitudinal beams 51 and a pair of lower longitudinal beams 52 connected between four vertical beams 53 which make up the four corner columns of the frame structure 50. A pair of upper transverse beams 54 and a pair of lower transverse beams 55 are connected between the vertical corner beams 53 and extend at right angles to the longitudinal beams 51 and 52 to complete the perimeter of the three-dimensional frame structure 50. Intermediate vertical beams 56 are secured to and extend between the upper and lower longitudinal beams 51 and 52. All of the foregoing beams 51–56 are preferably fabricated from elongated hollow steel tubes of rectangular cross-section.

Upper transverse steel I-beams 57 run between the upper longitudinal beams 51 intermediate the end transverse beams 54. Lower transverse steel I-beams 58 extend between the lower longitudinal beams 52 intermediate the end transverse beams 55. The joints between all of the foregoing beams 51–58 are formed by welding so as to provide a frame structure 50 which is extremely strong and rigid.

A short downwardly extending leg member 59 is welded to the underside of the lower longitudinal beams 52 below each of the intermediate vertical beams 56. A metal foot plate or bearing plate 60 is welded to the bottom of each of the leg members 59 as well as to the bottom of each of the vertical corner beams 53. In use, the frame is supported in place on the plate 60.

In a preferred lifting arrangement, a series of nine upwardly extending lifting nuts 61 are welded to the top side of each of the upper longitudinal beams 51. Such lifting nuts 61 are spaced apart along the length of each such upper longitudinal beam 51 as shown. As indicated in FIG. 5, each of these lifting nuts 61 is of a hollow cylindrical construction and each is internally threaded for purposes of receiving a lifting bolt (not shown) which will be considered in greater detail hereinafter. Such lifting nuts 61 are used for lifting and manipulating the building module.

The frame structure 50 in the present example has a length of 40 feet, a width of 12 feet and a height of 9 feet 10 inches as measured from the top surface of upper longitudinal beam 51 to the bottom surface of the corresponding lower longitudinal beam 52. Among other things, these dimensions satisfy the various governmental regulations for load sizes that can be transported over public highways.

As indicated in FIG. 3, each of the building modules 20, 21 and 22 includes permanent closure structure secured to and closing some but not all roof, floor and wall sides of the frame structure, any side not so closed being one that will abut another module in forming the complete control center building 28. In the present embodiment, each of the building modules 20, 21 and 22 is provided with a floor structure and a roof structure with the floor structures and roof structures for the different building modules being of very nearly the same construction. The wall structures, on the other hand, vary somewhat from module to module. In particular, the three sides of the outer building module 20 which do not abut or face the center building module 21 are closed by solid opaque wall panels 62 which are mounted within the openings or bays defined by the longitudinal, vertical and transverse beams 51–56, with the exception that the wall structure for the left-hand end of the building module 20 includes a double door 63.

The middle building module 21 does not have any permanent closure panels or wall panels on the two long sides thereof as these sides abut or face the outer building modules 20 and 22. The wall structure at the right-hand end of building module 21 includes glass window panels 64 and 65 and a door 66 which are mounted within the opening defined by the vertical beams 53 and the transverse beams 54 and 55. The wall structure at the left-hand end of building module 21 includes one of the solid wall panels 62 and a double door 67.

The wall structure for the remaining building module 22 is similar to that for the building module 20, the wall structure at the left-hand end of building module 22 including one of the solid wall panels 62 and a double door 68. The other two closed sides of the building module 22 are closed by solid opaque wall panels 62.

Referring now to FIG. 5, there will now be considered in greater detail the manner of fabrication of the floor, roof and wall structures for the building modules. For point of reference, FIG. 5 is a fragmentary cross-sectional view taken along section line 5—5 of FIG. 3. As such, it shows a cross section of the outer building module 22 and part of a cross section of the middle building module 21. Nevertheless, since the same general manner of construction is used for all three building modules 20, 21 and 22, it will be understood that the description of FIG. 5 is also applicable to the other building modules 20 and 21.

Considering first the wall structure, a typical one of the solid panels 62 is shown in cross section in FIG. 5. As there seen, the wall panel 62 is comprised of a thin-walled hollow metal enclosure 70 filled with thermal insulation material 71 which may be, for example, a urathane foam material. Mounting brackets 72 are secured to the upper and lower longitudinal beams 51 and 52 and the wall panel 62 is fastened to such mounting brackets 72. Caulking material 73 provides a weatherproof seal between the edges of the wall panel 62 and the adjoining frame structure beams, such as the upper and lower longitudinal beams 51 and 52 shown in FIG. 5. Similar caulking material is located in the joints between adjacent ones of the wall panels 62.

As indicated in FIG. 5 for the building module 22, each of the building modules 20, 21 and 22 include a floor structure 74. Such floor structure 74 includes a series of steel floor plates 75 which are laid across the lower transverse I-beams 58 and tack welded thereto to form a solid floor covering. A layer of plywood 76 is laid over the steel plates 75 and a layer of vinyl asbestos floor tile 77 is bonded to the top side of the plywood 76 to provide the uppermost floor surface. After the building modules, in this case the building modules 21 and 22, are joined together, pieces of plywood 78 are laid on top of the abutting longitudinal beams 52 so as to match up with the plywood layers 76 in the adjacent modules. A layer of vinyl asbestos floor tile 79 is bonded to the upper surface of the plywood 78 to complete the floor covering in the space where the modules meet.

The roof structure for the building module 22 is indicated at 80 in FIG. 5. The roof structures for the other building modules 20 and 21 are of similar construction. The roof structure 80 includes elongated boards 81 (for example, two-by-fours) which extend along and are fastened to the top surfaces of the upper longitudinal and transverse beams 51 and 54 to form a perimeter frame for the roof structure 80. Additional elongated boards 82 are fastened atop the first boards 81. Appropriate vertically extending holes are drilled through the boards 81 and 82 for allowing the lifting nuts 61 to extend upwardly therethrough as shown.

Corrugated-type steel decking plates 83 are laid across and welded to the tops of the upper transverse I-beams 57 to completely close off the area within the confines of the outermost upper horizontal beams 51 and 54. Two layers 84 and 85 of rigid thermal insulation material are laid across and cover the corrugated steel decking 83. A layer 86 of tar or asphalt material is then poured and spread over the top of the insulation material 85 and the exposed upper surfaces of the perimeter boards 82 to provide a completely weatherproof covering for the top of the building module 22.

Care is taken to prevent any of the tar or asphalt material from flowing into the threaded passages within the lifting nuts 61 during the initial construction of the building modules.

Overlapping metal flashing pieces 87 and 88 are fastened to the outer surfaces of perimeter boards 81 and the upper surfaces of perimeter boards 82 to cover same and to complete the weatherproof seal on the three sides of the building module 22 which do not abut the adjacent building module 21. On the side abutting the module 21, metal flashing 89 is used. Flashing 89 includes an upwardly-extending lip 90 for use in providing a weatherproof seal with the adjacent building module 21. After the building modules have been joined together at the installation site, caulking material 91 is placed between the upwardly extending metal flashing lips 90 running the length of the abutting sides of the two modules 21 and 22. An elongated and inverted U-shaped cap member 92 is then placed down over and secured to the upwardly extending lips 90 to complete the weatherproof seal between abutting building modules 21 and 22.

A typical manner of joining together abutting building modules is also shown in FIG. 5. More particularly, after the building modules 21 and 22 have been set in place in a side-by-side manner on the foundation structure, the two building modules 21 and 22 are bolted together by means of bolts 94 and nuts 95. Bolts 94 pass through the adjoining upper and lower longitudinal beams 51 and 52 by way of appropriate holes or passageways drilled through the sides thereof. As indicated in FIG. 3, the upper longitudinal beams 51 are bolted together by two such bolts 94, one being located near the left-hand end of the building modules 21 and 22 and the other being located near the right-hand end of the building modules 21 and 22. Similarly, the lower longitudinal beams 52 are bolted together by means of a first bolt 94 (not visible) located near the left-hand end and a second bolt 94 (not visible) located near the right-hand end. Additional nuts and bolts may be used if desired, but the four indicated have been found to be sufficient.

As indicated in FIG. 3, a suspended ceiling 96 is hung below the upper transverse I-beams 57. The space between the suspended ceiling 96 and the underside of the I-beams 57 is approximately 8 inches in the present embodiment. This suspended ceiling 96 is not shown in FIG. 5 for sake of simplicity.

Figure 6:
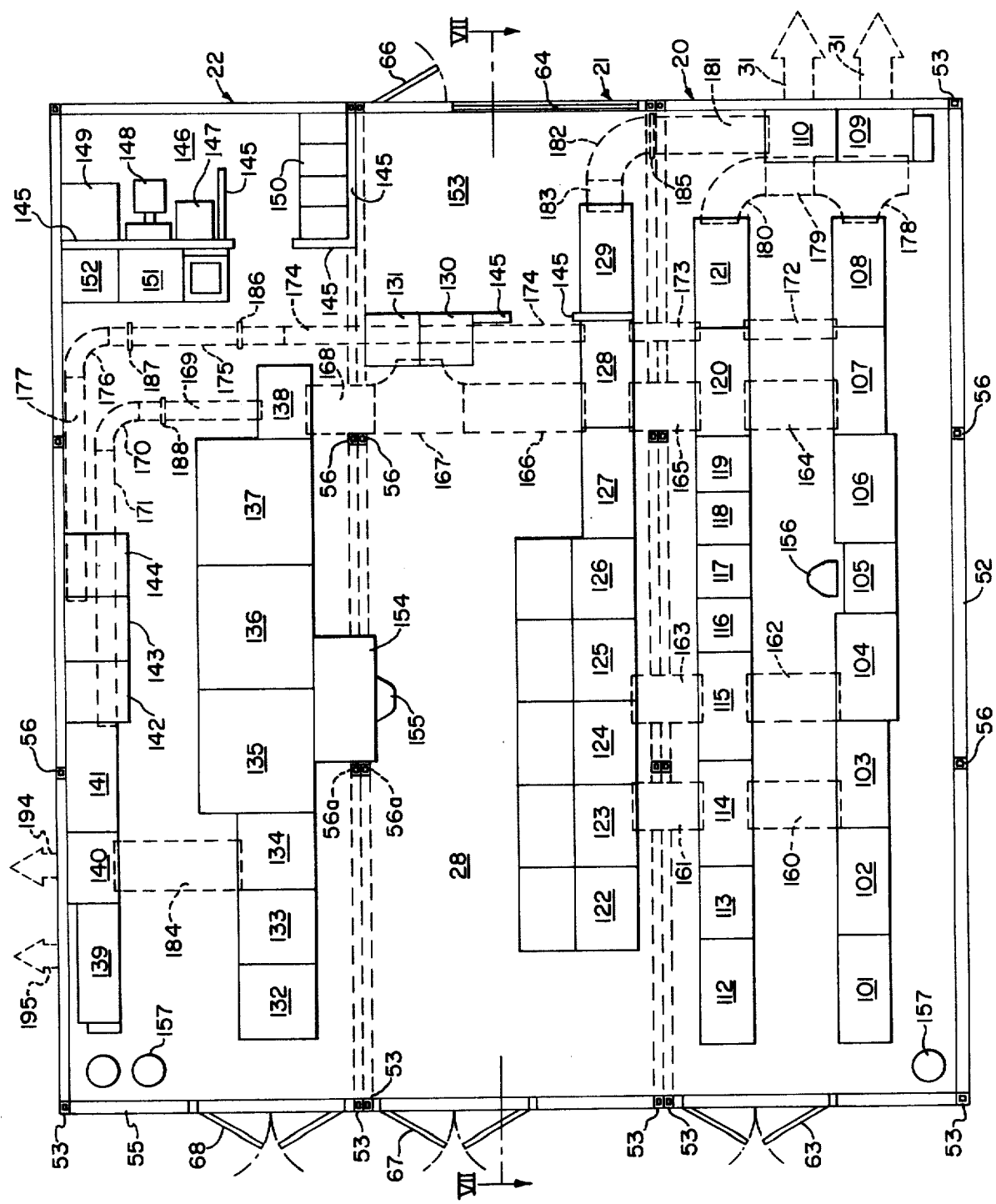
FIG. 6 is a floor plan of the operating center building of FIG. 3 showing the various electrical equipment units installed therein.

Referring to FIG. 6, there is shown a floor plan of the operating center building 28 of FIG. 3 as it appears with the control system equipment installed therein. The control system equipment shown in FIG. 6 is designed for use in controlling the electric power generating plant 30 shown in FIG. 2.

Figure 7:
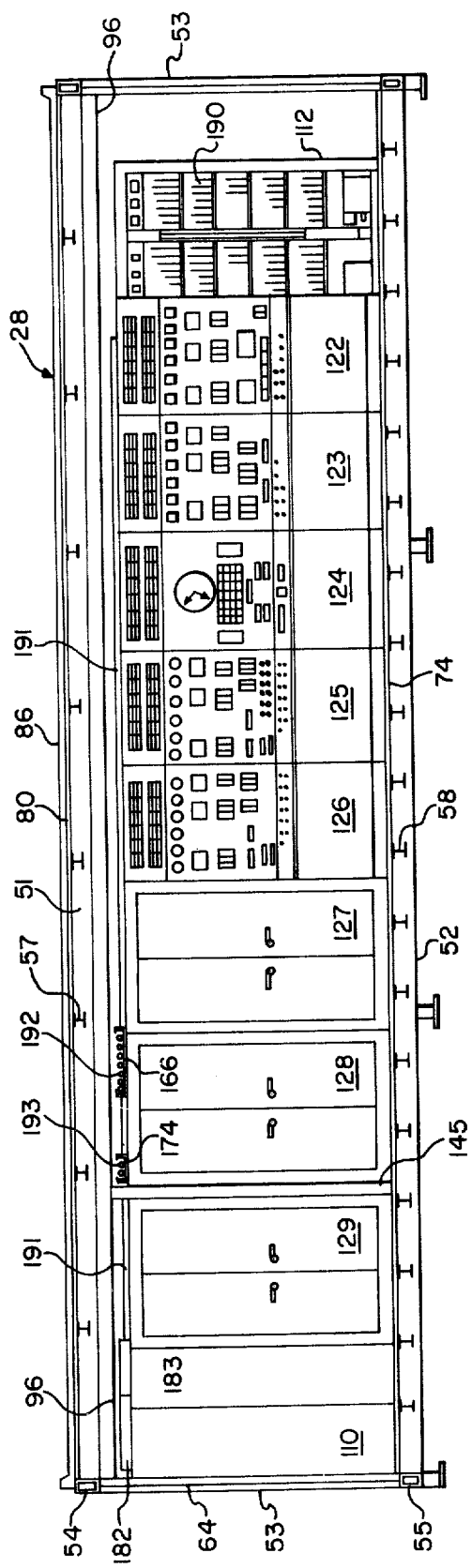
FIG. 7 is a longitudinal cross-sectional view of the operating center building taken along section line 7—7 of FIG. 6 after installation of the electrical equipment units.

FIG. 7 is an elevational-type cross-sectional view of the operating center building 28 taken along a section line corresponding to section line 7—7 of FIG. 6. Such view is taken with the control system equipment installed in the operating center building 28. FIG. 7 will be referred to from time to time in connection with the description of FIG. 6.

The control system equipment shown in FIG. 6 includes the following units:

| Unit Number | Description |
| --- | --- |
| 101 | Digital Control Input/Output Equipment for Steam Turbine 42 and Plant Auxiliaries. |
| 102 | Digital Control Input/Output Equipment for Gas Turbine 32 and Heat Recovery Steam Generator 35. |
| 103 | Digital Control Input/Output Equipment for Gas Turbine 37 and Heat Recovery Steam Generator 40. |
| 104 | Digital Computer Number 1 (Central Processing Unit). |
| 105 | Programmer Console. |
| 106 | Digital Computer Number 2 (Central Processing Unit). |
| 107 | Digital Information Input/Output Equipment. |
| 108 | Digital Information Input/Output Equipment. |
| 109 | Control Cable Connector Panel. |
| 110 | Control Cable Connector Panel. |
| 112 | Analog Control Equipment for Steam Turbine 42. |
| 113 | Analog Control Equipment for Condenser 44. |
| 114 | Analog Logic Equipment for Heat Recovery Steam Generator 35. |
| 115 | Analog Control Equipment for Heat Recovery Steam Generator 35. |
| 116 | Analog Control Equipment for Gas Turbine 32. |
| 117 | Analog Test Panel. |
| 118 | Analog Test Panel. |
| 119 | Analog Control Equipment for Gas Turbine 37. |
| 120 | Analog Logic Equipment for Heat Recovery Steam Generator 40. |
| 121 | Analog Control Equipment for Heat Recovery Steam Generator 40. |
| 122 | Operator Control Panel for Plant Electrics and Auxiliaries. |
| 123 | Operator Control Panel for Steam Turbine 42. |
| 124 | Operator Control Panel for Coordinated Plant Control. |
| 125 | Operator Control Panel for Gas Turbine 32 and Heat Recovery Steam Generator 35. |
| 126 | Operator Control Panel for Gas Turbine 37 and Heat Recovery Steam Generator 40. |
| 127 | Monitor Equipment for Steam Turbine 42. |
| 128 | Direct-Current Power Supply Cabinet For Control System Equipment. |
| 129 | Direct-Current Power Supply Cabinet For Control System Equipment. |
| 130 | Monitor Equipment for Gas Turbine 32. |
| 131 | Monitor Equipment for Gas Turbine 37. |
| 132 | Protective Relay Cabinet For Electrical Power Generator 33. |
| 133 | Protective Relay Cabinet for Electrical Power Generator 38. |
| 134 | Protective Relay Cabinet for Electrical Power Generator 43. |
| 135 | Voltage Regulator Cabinet for Electrical Power Generator 33. |
| 136 | Voltage Regulator Cabinet for Electrical Power Generator 38. |
| 137 | Voltage Regulator Cabinet for Electrical Power Generator 43. |
| 138 | Logging Typewriter Cabinet. |
| 139 | Utility Cable Connector Panel. |
| 140 | Power Cable Connector Panel. |
| 141 | Gas Turbine Start-Up Sequencer. |
| 142 | Inverter Cabinet. |
| 143 | Inverter Cabinet. |
| 144 | Inverter Cabinet. |

As indicated in FIG. 6, the operating center building 28 further includes various floor-to-ceiling interior wall panels or interior partitions 145, some of which serve to define a lavatory area or bathroom 146. Lavatory 146 includes a wash basin 147, a toilet 148, and a stall shower 149. The operating center building 28 also includes a set of storage lockers 150, a kitchenette unit 151 and a storage closet 152. Kitchenette 151 includes a stove, refrigerator and sink. These facilities are provided for the convenience and well being of the plant operating personnel. The kitchenette unit 151 is particularly handy where the plant is located in a relatively remote area.

Located at the right-hand end of the middle building module 21 is an entrance foyer 143, the inner boundaries of which are defined in part by the power supply cabinet 129, interior wall panels 145 and the covered backs of the gas turbine monitor cabinets 130 and 131.

A desk 154 is located on the dividing line between building modules 21 and 22 near the center thereof. During transportation of the building modules from the factory site to the installation site, this desk 154 is moved into and transported within the building module 21. The desk 154 is provided with a chair 155.

The programmer's console 105 located near the middle of building module 20 is also provided with a chair 156. Fire protection equipment 157 is installed in the vicinity of the outer left-hand corners of building modules 20 and 22.

After the building modules 20, 21 and 22 reach the installation site 27, certain ones of the frame structure intermediate vertical beams 56 are removed to improve the interior layout. The locations of the vertical beams 56 which are removed are indicated by reference numerals 56a in FIG. 6. They are located along the dividing line between building modules 21 and 22, just to the left of the desk 154. Thus, vertical beams 56 are present at locations 56a during the factory assembly and testing and during transportation of the building modules 21 and 22 to the installation site, and they are removed during the installation of the building modules 21 and 22 at the installation site. They are needed to provide the necessary structural strength when the loaded building modules 21 and 22 are being lifted. In this regard, the final loaded weights of the building modules 20, 21 and 22 are approximately 41,000 pounds, 35,000 pounds and 45,000 pounds, respectively. The vertical beams 56 at locations 56a are removed during the installation of the building modules at the plant site to provide a more spacious and open work area.

With some minor exceptions, the equipment in each of the units 101–144 is housed in its own individual cabinet or rack structure. Since, in most cases, each unit is dedicated to a particular control or operating function or to the control of a particular portion of the plant power generating apparatus, this segregation facilitates both the initial construction and installation and the later servicing and maintenance of the control system equipment. At the factory site 23, these equipment cabinets or structures are moved into the loading modules 20, 21 and 22 by way of the double-type loading doors 63, 67 and 68. They are then set in place in their proper locations within the building modules 20, 21 and 22. They are thereafter bolted down to the floor structures 74 (FIG. 5) of the building modules 20, 21 and 22 by means of bolts which pass downwardly through the vinyl asbestos floor tile 77, the plywood flooring material 76 and the steel floor plates 75 forming the floor structure 74. In a few cases, the equipment for two different units is housed in the same cabinet.

An elevational view of the cabinets for equipment units 122–129 is shown in FIG. 7. FIG. 7 also shows part of the open backside of the cabinet for equipment unit 112. In use, such backside of the unit 112 is uncovered. This is true also for a number of the other equipment cabinets. Among other things, it facilitates servicing of the equipment. Various printed circuit cards and other electronic components 190 are mounted within the cabinet of unit 112. The same is true of a majority of the other cabinets.

The control system equipment units 101–144 are inter-wired and interconnected by means of electrical cables which, in the present embodiment, are laid along the tops of the cabinets which house such equipment. Where it is necessary to connect the electrical equipment in one of the rows with electrical equipment in another of the rows, then the necessary connecting cables are preferably laid in overhead raceways in the form of overhead cable trays which span the walkway aisles and other open areas between equipment cabinets. Such cable trays are supported by the tops of the equipment cabinets at the ends of the spans.

The overhead cable trays are shown in broken line in FIG. 6 and are identified by reference numerals 160–184, inclusive. Cable tray 160, for example, spans the aisle or walkway between equipment cabinets 103 and 114. The ends of such cable tray 160 extend a short distance over the tops of the cabinets 103 and 114. One end of the cable tray 160 is bolted to the top of the cabinet 103 while the outer end is bolted to the top of cabinet 114. Support brackets 185–188 are used to provide intermediate support for some of the longer cable tray spans which have to run a relatively long distance between equipment cabinets. These support brackets 185–188 are attached to and suspended from the roof structures 80 of the appropriate building modules 20, 21 and 22.

Some of the overhead cable trays and overhead connecting cables are shown in FIG. 7. Thus, by way of example, connecting cables 191 run from the operator control panel units 122–126 to the cable connector panel 110, the latter being used in connecting the control center equipment to the remainder of the power plant. These connecting cables 191 run across the tops of the equipment cabinets 127–129 and then by way of cable trays 183, 182 and 181 (FIG. 6) to the cable connector panel cabinet 110. Transversely extending overhead cable trays 166 and 174 are also visible in FIG. 7. These cable trays 166 and 174 carry various connecting cables 192 and 193, respectively.

The control system equipment in the equipment units 101–144 is completely inter-wired and interconnected at the factory site 23. The connections between equipment in different ones of the building modules 20, 21 and 22 are made by means of inter-module equipment-connecting cables having quick connect/disconnect connectors at the end terminals thereof. These cable connectors mate with corresponding cabinet connectors of the opposite sex which are, typically, mounted on the backsides of the appropriate equipment unit cabinets. After the control system equipment has been thoroughly tested at the factory site, each of these inter-module connecting cables is disconnected at one end thereof and pulled back into the building module housing the equipment to which the other end of such inter-module cable is connected. This enables the building modules 20, 21 and 22 to be separated from one another and separately transported to the industrial or commercial installation site.

After the building modules 20, 21 and 22 are installed at the installation site 27, the pulled-back portions of these inter-module connecting cables are then returned to their original building modules and reconnected to their respective control equipment units. This procedure enables the control system equipment, as a whole, to be quickly returned to a ready-to-go operating condition.

In the process of pulling back the inter-module connecting cables preparatory to shipment, the overhead cable trays 161, 163, 165, 168, 173, 174 and 181 which cross the boundaries between building modules 20, 21 and 22 are unfastened from the equipment cabinets at the two ends thereof and stowed for shipment inside individual ones of the building modules 20, 21 and 22. These cable trays are subsequently returned to their in-use positions at the installation site 27.

The control cable connector panel units 109 and 110 are used to connect the control system equipment within the building modules 20, 21 and 22 to the remainder of the electric power generating plant 30. More particularly, all of the signal input and signal output terminals of the control equipment and monitoring equipment within the building modules 20, 21 and 22 which are intended to receive signals from or to send signals to the remainder of the plant 30 are connected to the control cable connector panels 109 and 110. Similarly, the underground control signal cables 31 (FIG. 1) which run from the operating center building 28 to the gas turbines, steam turbine, steam generators and other equipment making up the power plant 30 are also connected to connector panels 109 and 110. Connector panels 109 and 110 provide connections between, that is, interconnected, the individual building module signal conductors with the appropriate ones of the individual signal conductors in the underground plant cables 31. Connector panels 109 and 110 thus provide the interface between the control system equipment in the operating center building 28 and the various condition sensing devices and actuating devices located throughout the remainder of the plant 30.

By way of example only, the various underground cables 31 may include a total of somewhere on the order of 300 individual signal conductors. The use of the connector panels 109 and 110 enables the rapid and orderly connection of these signal conductors to the operating center equipment. It considerably simplifies the task of the technicians at the plant site who have to make the interconnections. The use of such connector panels 109 and 110, together with the fact that all of the underground cables 31 will run to a fixed and known point at the plant site, means that the cables 31 can be laid out and installed at the plant site before the arrival of the building modules 20, 21 and 22. This enables a more efficient scheduling and usage of the plant site labor personnel.

The use and location of the connector panels 109 and 110, together with the layout and location of the control and monitoring equipment within the building modules 20, 21 and 22 also affords substantial economies in the connecting and inter-wiring of such equipment, both with itself and with the plant equipment outside the building 28. With reference to FIG. 6, the control system equipment is laid out in three adjacent rows which extend or run in the lengthwise direction within the building modules 20 and 21. The first row includes units 101–108, the second row includes units 121–121 and the third row includes units 122–129. The connector panels 109 and 110 are positioned in a location which is close to and convenient to the same end of all three of these rows. Thus, the control system connecting cables can, for the most part, run directly along the tops of the equipment cabinets and to the connector panels 109 and 110. Also, the connector panels 109 and 110 are located in the building module, namely, the building module 20, having the control system equipment requiring the greater number of connecting cables. This minimizes the number of connecting cables which need to be disconnected in order to separately transport the building modules from the factory site to the plant site.

Connections between the protective relay cabinets 132, 133 and 134 and the voltage regulator cabinets 135, 136 and 137 and the corresponding electrical generators 33, 38 and 43 are completed by way of the power cable connector panel unit 140. Within the control center building 28, units 132–137 are connected by way of cabling to the power cable connector panel 140. External to the control center building 28 are various cables 194 which are connected to the power cable connector panel 140 and which run to the electrical generators 33, 38 and 43 for providing the desired protection and voltage regulation for same.

Alternating-current power for operating the lighting fixtures and other utilities within the building modules 20, 21 and 22 is supplied to a utility connector panel 139. Direct-current power for use in connection with the control system equipment is also supplied through the utility connector panel 139. The appropriate alternating-current and direct-current power cables running to the control center building 28 are indicated at 195. The alternating-current power is obtained from the plant electrical system, while the direct-current power is obtained from a plant battery bank.

The power supply system for supplying the operating voltages and currents for the control system equipment within the building modules 20, 21 and 22 includes inverter units 142, 143 and 144 and power supply units 128 and 129. Inverters 142, 143 and 144 are connected to direct-current power terminals in the utility connector panel 139. Inverter units 142, 143 and 144 serve to convert the direct-current voltage supplied to the control center building 28 into 110-volt alternating-current voltage. This alternating-current voltage is then supplied to the power supply circuits in the power supply units 128 and 129. These power supply circuits serve to convert the alternating-current voltage into the relatively low-voltage direct-current voltages needed to energize the computer circuits, control circuits and other circuits located in units 101–108, 112–127, 130, 131 and 138. The use of the plant battery bank, inverters 142, 143 and 144 and power supply units 127 and 128 provides a power supply system for the control equipment which is relatively immune to voltage transients and other disturbances which may occur in the alternating-current system driven by the plant electrical generators 33, 38 and 43.

Each of the digital computer units 104 and 106 is a programmable digital computer central processing unit and, as such, includes a magnetic core memory, an arithmetic and logic unit and a control unit. The digital computer units 104 and 106 may be programmed by way of the programmer's console 105. Digital computer 104 and digital control input/output units 101, 102 and 103 are capable, when properly programmed, of providing automatic start-up, operation and shutdown of the entire electric power generating plant 30. Digital computer 106 and digital information input-/output units 107 and 108 serve to monitor the operation of the power generating plant 30 and to supply the appropriate signals to various indicating meters, digital readout devices and alarm indicators and, in conjuntion with logging typewriter unit 138, to provide various types of hard copy information printouts. Each of the computer central processing units 104 and 106 may take the form of, for example, the PRODAC P-2000 central processor unit currently manaufactured and marketed by Westinghouse Electric Corporation of Pittsburgh, Pennsylvania. The input/output units 101, 102, 103, 107 and 108 may also take the form of such equipment as used in the PRODAC P-2000 computer system.

The analog type electronic control circuits contained in analog units 112–116 and 119–121 provide a complete analog control system which is capable of operating either the entire plant or selected parts thereof in the event that the digital control system should develop a malfunction or in case the plant operator should desire to operate in the analog mode. Thus, among other things, the analog control system provides a backup for the digital control system.

Operator control panels 122–126 provide a master control station from which the plant operator can monitor, supervise and control the operation of the entire power generating plant 30, as well as the control system equipment within the operating center 28. Plant coordinated control panel 124, for example, enables the operator to select the operating mode for the control system equipment, that is, to select whether the control system is to operate in a total plant coordinated automatic mode, a non-coordinated automatic mode, a total or partial analog mode or a total or partial manual mode. Control panels 123, 125 and 126 include various readout indicators, recorders, control knobs and pushbuttons for individually supervising the operations of the gas turbines 32 and 37, the steam generators 35 and 40 and the steam turbine 42 and for establishing various setpoints and operating conditions for such plant equipment. In this regard, it is noted that, when operating in the total plant coordinated automatic mode, most of the setpoints and operating conditions are established automatically by the digital computer 104.

As indicated by the foregoing, the building modules 20, 21 and 22 serve to house various sophisticated and complex electronics data handling and control equipment. In the illustrated embodiment, such equipment enables a highly automatic, highly efficient and highly reliable operation of the electric power generating plant 30.

In addition to the construction of the operating center building 28, the modular approach is also applied to the construction and layout of the control system equipment located within the operating center building 28. Thus, as seen from FIG. 6, substantially all of the digital computer equipment is laid out in a first row (units 101–108), substantially all of the analog control equipment is laid out in a second row (units 112–121) and substantially all of the operator control panel equipment is laid out in a third row (units 122–126). Within the first row, the digital equipment is subgrouped according to control and information monitoring functions, the control equipment (units 101–104) being located on the left and the information monitoring equipment being located on the right. Where feasible, such as with the digital control input/output equipment (units 101–103), the equipment is further subgrouped according to the major plant components to be controlled. Thus, input/output unit 101 is associated with the steam turbine and condenser 44, input/output unit 102 is associated with the gas turbine 32 and steam generator 35 and input/output unit 103 is associated with the gas turbine 37 and steam generator 40.

In the second row, the analog control equipment is subgrouped according to the major plant components to be controlled. Thus, unit 112 is associated with the steam turbine 42, unit 113 is associated with the condenser 44, units 114 and 115 are associated with the steam generator 35, unit 116 is associated with the gas turbine 32, unit 119 is associated with the gas turbine 37 and units 120 and 121 are associated with the steam generator 40.

In the third row, the operator control panel equipment 122–126 is also, for the most part, subgrouped according to the major plant areas to be controlled. The major exception, more or less, is control panel unit 124 which relates primarily to the coordinated control of the total plant. With respect to the remainder of the control panel units, unit 126 is associated with the gas turbine 37 and steam generator 40, unit 125 is associated with the gas turbine 32 and steam generator 35, unit 123 is associated with the steam turbine 42 and condenser 44 and unit 122 is associated with the plant electrics and auxiliaries.

An important advantage of the equipment modularity for the control system equipment is that failure of any single equipment unit will not reduce total plant power generating capacity by more than 50 percent. Another advantage is flexibility. If, for example, a power plant is to be constructed having a greater or lesser number of gas turbines, then the number of gas turbine associated equipment units in the operating center is adjusted accordingly. If need be, additional building modules can be provided to accommodate additional control equipment units. Further advantages accrue from economies and savings in time in manufacture, installation and maintenance of the control equipment.

DESCRIPTION OF THE BUILDING MODULE HANDING AND INSTALLATION TECHNIQUE

Figure 8:
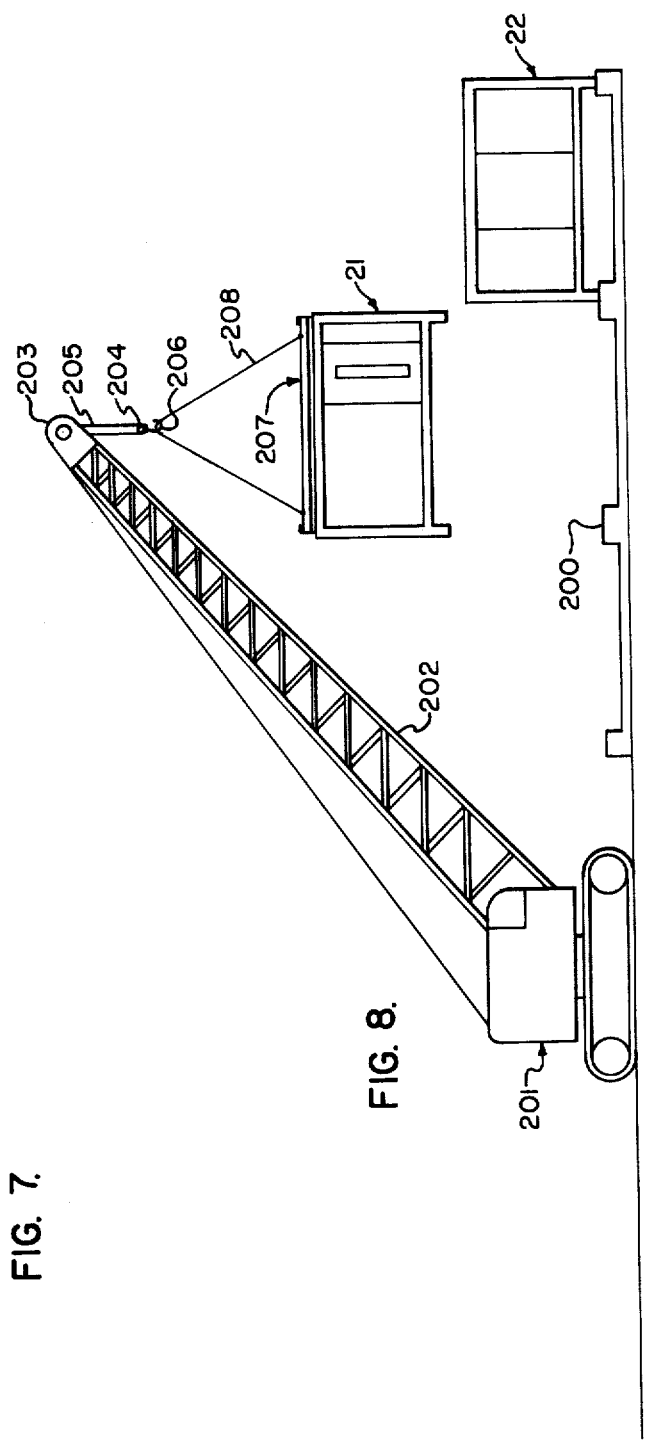
FIG. 8 illustrates a preferred manner in which the pre-loaded building modules may be installed at the industrial or commercial installation site.

Referring now to FIG. 8, there is shown a presently preferred method of handling and installing the loaded building modules 20, 21 and 22 at the industrial installation site 27. While FIG. 8 and the following description relate to the installation site 27, it is noted that the handling aspects of the method are also applicable to the handling of the building modules at the factory site 23. Be that as it may, it is assumed for purposes of FIG. 8 that the three loaded building modules 20, 21 and 22 were transported to the installation site 27 by means of three truck-type tractor-trailer units. At the installation site 27, the building modules 20, 21 and 22 are, one at a time, lifted from their respective truck trailers and lowered into place in an abutting side-by-side manner on a previously prepared foundation structure 200. The lifting and lowering is accomplished by means of a motorized lifting crane 201 having an upwardly extending derrick structure 202 capped by a crown block 203. A travelling block 204 is movably suspended from the crown block 203 by lifting cables 205. A lifting hook 206 is attached to and extends below the underside of the travelling block 204.

Attached to the top side of the building module being handled at the moment illustrated, namely, the building module 21, is a detachable lifting frame 207. Lifting frame 207 is suspended from the crane hook 206 by a lifting sling formed by cables 208. The ends of cables 208 are attached to the lifting frame 207 and the mid portions of cables 28 pass through the crane hook 206.

After the building module 21 is lowered into place, the lifting frame 207 is detached therefrom and attached to the top of the next building module to be installed, in this case, the building module 20. Thereafter, this next building module 20 is lifted from its truck trailer and set in place on the foundation structure 200 alongside of the preceding building module 21.

Figure 9:
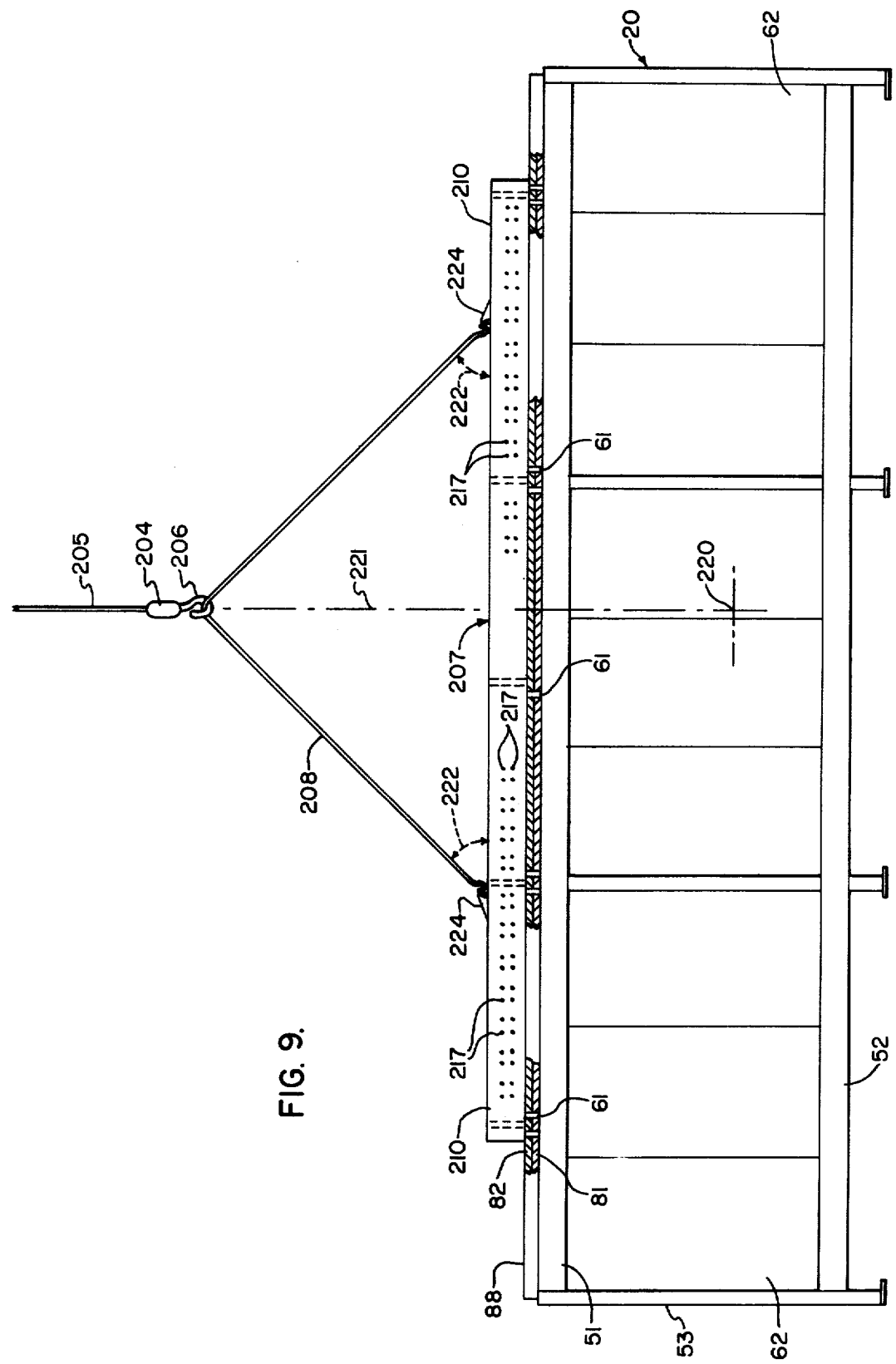
FIG. 9 is an enlarged elevational view showing in greater detail a preferred manner of lifting one of the building modules by means of a novel detachable lifting frame structure.
Figure 10:
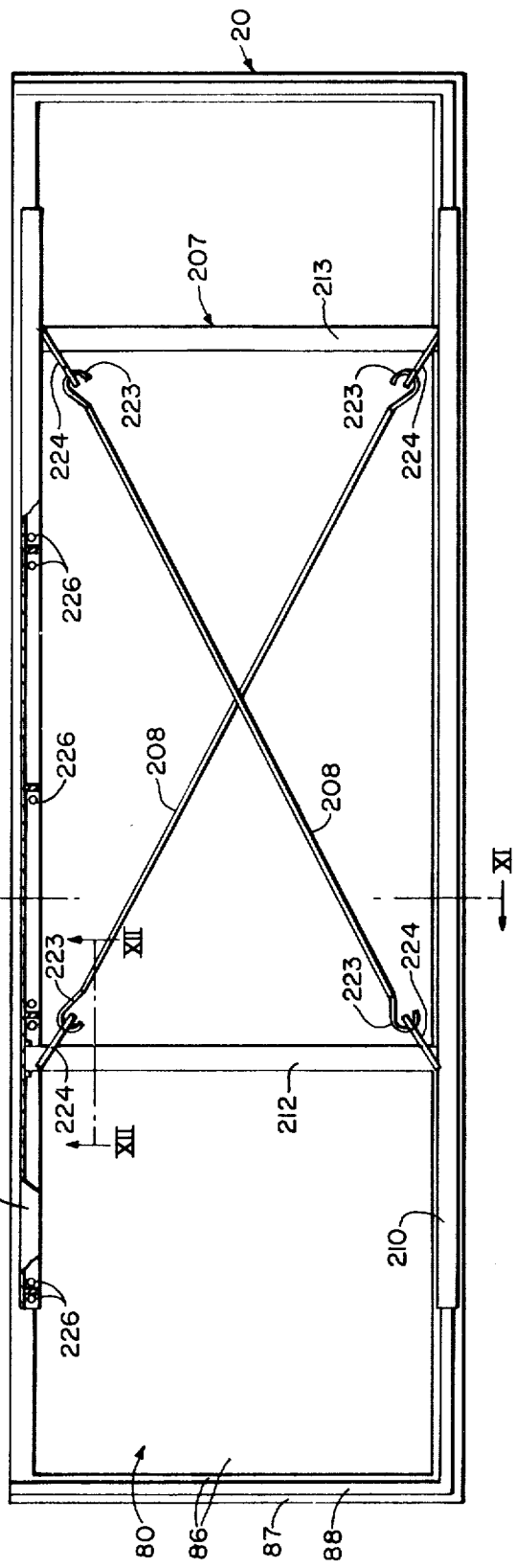
FIG. 10 is a top view of the building module of FIG. 9 and the lifting fram structure which is temporarily attached thereto for lifting purposes.

Referring to FIGS. 9–12, there will now be described in greater detail the construction of the detachable lifting frame 207 and the manner of fastening same to the top of a typical building module which, for sake of example, will be assumed to be the building module 20. As seen in FIG. 10, the lifting frame 207 includes a pair of longitudinal channel beams 210 and 211 which, in use, are positioned above the upper longitudinal beams 51 of the building module frame structure. The lifting frame 207 also includes a pair of I-beam cross braces 212 and 213 which extend between and are detachably connected to the longitudinal channel beams 210 and 211.

Figure 12:
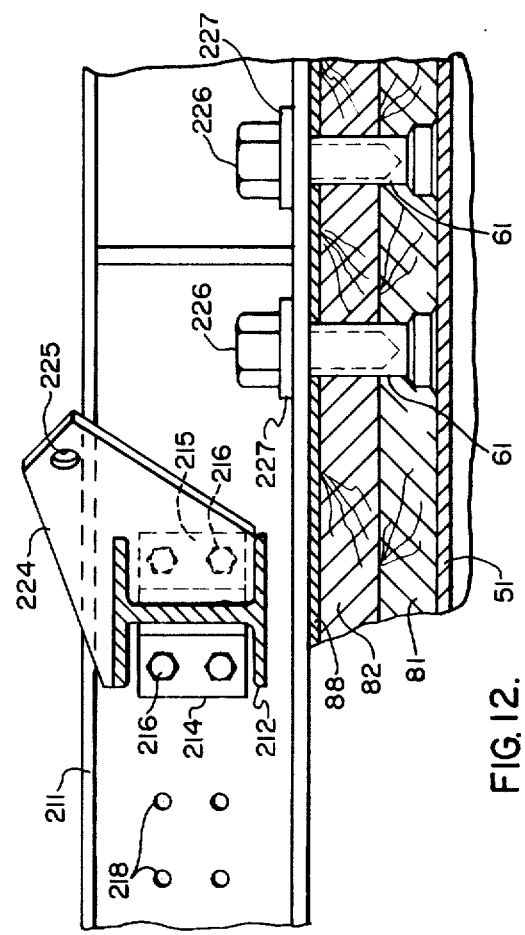
FIG. 12 is an enlarged fragmentary cross-sectional view taken along section line 12—12 of FIGS. 10 and 11 and showing in greater detail a portion of the lifting frame structure and its manner of attachment to the building module.
Figure 11:
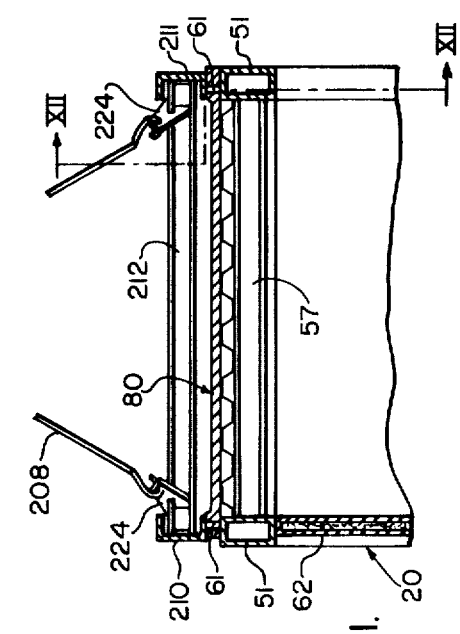
FIG. 11 is a transverse cross-sectional view of the building module and lifting frame structure taken along section line 11—11 of FIG. 10.

The manner of connection of the cross braces 212 and 213 to the longitudinal channel beams 210 and 211 is indicated in detail in FIG. 12 for the case of the end of the cross brace 212 which is connected to the channel beam 211. As there indicated, a pair of L-shaped connector brackets 214 and 215 are welded to the web of the I-beam cross brace 212 on opposite sides of such web that one leg of each connector bracket is fastened to the web while the other leg extends at right angles to and is flush with the end of the I-beam 212. Connector brackets 214 and 215 are connected to the longitudinal channel beam 211 by means of bolts 216 which pass through matching holes in the connector brackets 214 and 215 and the web of the channel beam 211. Nuts (not shown) are threaded onto the outer ends of the bolts 216 and tightened down so as to hold the connector brackets 214 and 215 and, hence, the end of the I-beam 212 securely against the web of the channel beam 211. The remainder of the connections between I-beam cross braces 212 and 213 and longitudinal channel beams 210 and 211 are of this same construction.

Typical holes in the webs of the longitudinal channel beams 210 and 211 for use in receiving the cross brace connector bolts 216 are indicated at 217 and 218 in FIGS. 9 and 12, respectively. As indicated in FIG. 9 for the case of channel beam 210, the connector bolt holes 217 are in the form of extended series of holes which are spaced longitudinally along the length of the channel beam 210 and which extend over substantial lengths of the channel beam 210 encompassing approximately the end-most thirds of the channel beam length. The pattern and extent of the cross brace connector bolt holes 218 in the other channel beam 211 are the same as that for the channel beam 210 shown in FIG. 9.

The use of multiple sets of connector bolt holes 217 and 218 enables the locations of the cross braces 212 and 213 along the lengths of the channel beams 210 and 211 to be changed or adjusted to better accommodate the weight distribution of the load to be lifted. In particular, the cross braces 212 and 213 are preferably located so that the longitudinal location of the center of gravity of the loaded building module will lie directly below the vertical centerline or line of lift for the crane hook 206, travelling block 204 and lifting cable 205 when the building module is being lifted. The preferred relationship is illustrated in FIG. 9 for the case of building module 20. In this case, it is assumed that the center of gravity of the loaded building module 20 is located at a point 220. The vertical centerline or line of lift for the hook 206, travelling block 204 and lifting cable 205 is indicated by broken line 221. As shown in FIG. 9, this crane lifting vertical centerline 221 passes through the building module center of gravity 220. This is the preferred relationship. It minimizes the chances of the building module tipping or tilting as it is being lifted or lowered.

As indicated in FIG. 9, the longitudinal location of the center of gravity 220 does not coincide with the longitudinal location of the physical center of the building module 20. This will quite often be the case because the building modules will frequently not be loaded in a symmetrical manner from a weight distribution standpoint. Also, the longitudinal locations of the centers of gravity of the different building modules which form a complete building will frequently not be the same because, typically, the control system equipment loaded into the different building modules will be of different sizes and shapes and will be located differently. This is taken into account by the provision of the extended series of cross brace connector bolt holes 217 and 218 in the webs of the channel beams 210 and 211. As a consequence, the locations of the cross braces 212 and 213 can be changed from one building module to the next so that, in each case, the centerline of lift for the crane hook 206 may assume a position directly above the longitudinal center of gravity location of the building module to be lifted. Thus, connector bolt holes 217 and 218 enable a center of gravity adjustment with respect to the load to be lifted.

In selecting the location for the cross braces 212 and 213, care should be taken so that the angles formed between the lifting cables 208 and the top surfaces of the longitudinal channel beams 210 and 211, such angles being indicated at 222 in FIG. 9, do not become less than approximately 45° when the load is being lifted.

As indicated in FIG. 10, the ends of the lifting sling cables 208 are provided with hooks 223 which are adapted to be hooked into hook receiving holes located in cable attachment plates 224 which are welded to the I-beam cross braces 212 and 213 near the ends thereof. A typical one of the cable attachment plates 224 is shown on an enlarged scale in FIG. 12. The hook receiving or cable attachment hole in the plate 224 is indicated at 225 in FIG. 12. The plate 224 is shaped to engage the upper flange, web and part of the lower flange of the I-beam 212 and is welded thereto along the entire line of engagement. The cable attachment hole 225 is located relative to the I-beam cross brace 212 such that a minimum of torque or twisting force is produced on the cross brace 212 when a load is being lifted.

The detachable lifting frame 207 is attached to the building module to be lifted, in the illustrated case the building module 20, by means of the two sets of nine lifting nuts 61 welded to the top of the building module frame structure along each of the two sides thereof.

The manner of attachment is best seen in the enlarged fragmentary view of FIG. 12. As there indicated, the longitudinal channel beam 211 of the lifting frame 207 runs along the tops of the lifting nuts 61. As previously indicated, lifting nuts 61 are welded to the top of the upper longitudinal beam 51 of the building module frame structure. The channel beam 211 is fastened to the lifting nuts 61 by means of threaded lifting bolts 226 which pass downwardly through leveling washers 227 and holes drilled in the bottom flange of the channel beam 211 and are threaded into the internally threaded lifting nuts 61. Washers 227 are beveled on the underside thereof so as to match the bevel or contour of the lower flange of the channel beam 211. Such leveling washers 227 are welded in place on such channel beam 211.

The other longitudinal channel beam 210 of lifting frame 207 is attached to its set of lifting nuts 61 by means of lifting bolts 226 (not shown) in the same manner as indicated in FIG. 12 for the longitudinal channel beam 211.

All of the elements of the detachable lifting frame 207, namely, elements 210–216 and 224–227, are preferably made of steel.

In use, the longitudinal channel beam 210 and 211 are bolted in place atop the building module 20 by locating same above the two sets of lifting nuts 61, inserting the lifting bolts 226 into the washers 227 and beam flange holes and threading same into the lifting nuts 61 to the desired degree of tightness. Thereafter, the locations of the I-beam cross braces 212 and 213 may be adjusted, if necessary, by unbolting same (bolts 216) and moving same to the desired locations, after which they are rebolted to the channel beams 210 and 211. Sling cable hooks 223 are then hooked to the cable attachment plates 224, whereafter the sling cables 208 may be placed in the crane hook 206 for purposes of lifting the building module 20.

After the three building modules 20, 21 and 22 are set in place in a side-by-side abutting manner on the foundation structure 200, neighboring ones of these building modules are bolted together by means of module connecting bolts 94 (FIG. 5) which pass through the upper and lower longitudinal beams 51 and 52 which abut one another, such bolts 94 being held in place by the nuts 95. Caulking material 91 is then placed in the joints between the roof structures 80 of the adjacent modules and the cap members 92 are secured in place astraddle the abutting upwardly extending metal flashing portions 90. This provides a weatherproof seal between abutting building modules. Thereafter, the center passages of the lifting nuts 61 are filled with tar and the exposed top surfaces of such lifting nuts 61 are covered with tar. At this point, or at some earlier appropriate point in the installation process, the temporary closure panels used to close the open sides of the building modules when transporting same are unfastened and removed from the building modules. The operating center building 28 is then ready for use from a structural standpoint.

DESCRIPTION OF ALTERNATIVE ARRANGEMENTS OF PREFERRED MODULE STRUCTURE

Figure 13:
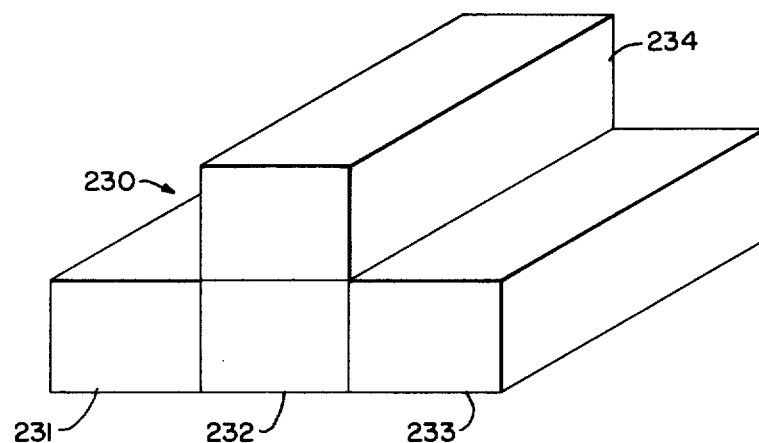
FIGS. 13-15 illustrate some of the alternative forms of operating centers which may be constructed using the principles of the present invention.
Figure 14:
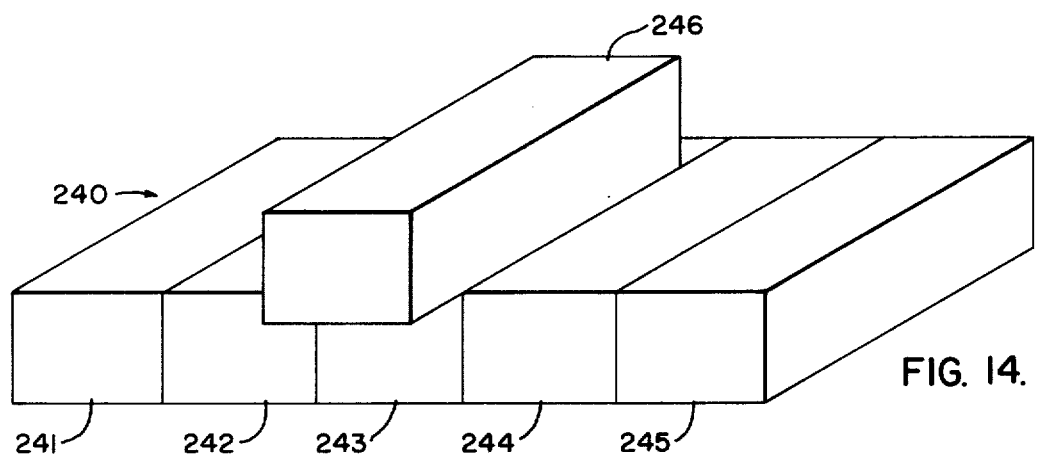
Figure 15:
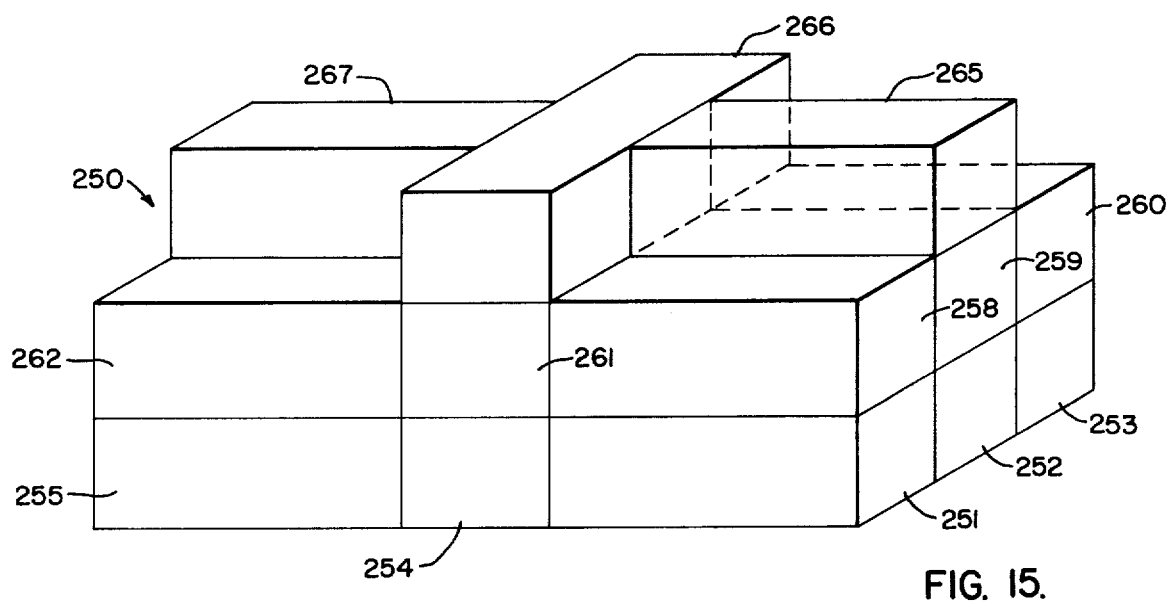

Referring to FIGS. 13–15, there are shown other forms of operating center buildings which can be constructed using the methods of the present invention. FIG. 13 shows an operating center building 230 comprised of four room-size building modules 231, 232, 233 and 234. Building modules 231–233 are located in a side-by-side manner at ground level, while building module 234 is stacked on top of the center ground level building module 232.

FIG. 14 shows an operating center building 240 comprised of six room-size building modules 241–246. Modules 241–245 are located in a side-by-side manner at ground level, while the remaining module 246 is located in a cantilever manner atop the center ground level module 243.

FIG. 15 shows a more complex three-story operating center building 250 comprised of seventeen room-size building modules 251–267. The center tier of modules 254, 261 and 266 are located at right angles to the remainder of the modules.

The forms of operating center buildings shown in FIGS. 13–15 are merely suggestive of the many and various possible building configurations which can be constructed using the methods and techniques of the present invention.

With certain minor exceptions, each of the building modules 231–234, 241–246 and 251–267 shown in FIGS. 13–15 is of the same basic construction as that previously considered for the building modules 20, 21 and 22. Each is comprised of a transportable, room-size, three-dimensional, rectangular, metal frame structure and each includes permanent closure means secured to and closing each side thereof that will not abut another module in forming the complete control center building.

Minor differences in construction do, of course, occur where one module is stacked on top of another. Considering, for example, the case of FIG. 13, no leg members 59 and bearing plates 60 (FIGS. 3–5) would be provided on the second story module 234. Also, the vertical corner beams 53 would not be extended below the undersides of beams 52 and 55. Furthermore, the roof structure 80 (elements 80–90 as shown in FIG. 5) would not be provided on the ground level module 232 which supports the second story module 234. Lifting nuts 61 would still be used on the top side of the ground level module 232 for purposes of lifting and handling same for transportation and installation. After the module 232 is installed at the installation site, these lifting nuts 61 may be removed before the second story module 234 is set into place. Alternatively, the lower longitudinal beams 52 of the second story module 234 may be provided with cutouts on the bottom side thereof for receiving the lifting nuts 61 on the first floor module 232. In such case, the lifting nuts 61 on module 232 need not be removed. The upper module 234 may be either bolted or welded to the lower module 232. Similar considerations would apply to the other multistory structures shown in FIGS. 14 and 15.

The building modules shown in FIGS. 13–15 are loaded with control system equipment and thoroughly tested at the factory site in the same general manner as considered for the earlier embodiment of FIG. 3. Thereafter, the loaded building modules are transported to the industrial or commercial installation site and installed at such installation site using the same techniques as previously considered. In the case of larger size operating center buildings, such as those shown in FIGS. 14 and 15, one or more of the building modules or parts thereof may be used to provide living quarters or office space or both for the operating center personnel.

Operating centers constructed in accordance with the present invention can be used in a variety of industrial and commercial applications which require the use of relativelycomplex electrical and electronics equipment. As indicated above, the invention is of particular significance in the construction of utility company type electric power generating plants. Typical examples of other industrial and commercial applications were the techniques described herein may be employed to advantage are: chemical plants, food processing plants, manufacturing plants, steel mills, paper mills, oil refineries, sewage treatment plants, electrical power transmission systems, pipeline transmission systems, railroad systems, aircraft traffic control systems, telephone systems, radio communications systems, data processing systems, weather forecasting systems and the like. For the case of data processing systems, for example, the techniques of the present invention can be used to erect a fully-equipped ready-to-operate data processing center at an industrial or commercial installation site in a minimum of time and with a minimum of labor at the installation site.

The present invention affords substantial advantages and economies in that a very large portion of the equipment installation work, equipment adjustment work and testing is efficiently and economically performed at the better equipped and better staffed factory or manufacturing site. Also, the amount of time required of relatively expensive labor personnel at the installation site is considerably reduced and the problems sometimes encountered in obtaining such labor personnel are minimized. A further advantage that will sometimes accrue is that, if later events should prove necessary, an operating center building constructed in accordance with the present invention can be fairly easily moved to or relocated at another and different installation site. In a general sense, all that need be done is to disconnect the building modules and transport them to the new installation site.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of building an operating center for a plant designed to produce goods or services, the steps of said method comprising:

loading each of a plurality of transportable room-size building modules with predetermined electrical control system equipment units at a factory site, such building modules constituting structural parts of a unitary operating center building and such control system equipment units constituting parts of a system for use in monitoring and/or controlling the operation of the production plant;

establishing at the factory site predetermined intramodule connections among the control equipment units within each building module;

establishing at the factory site predetermined intermodule connections among the control system equipment units in different ones of the building modules;

establishing at the factory site predetermined connections to the control system equipment units for ultimate attachment from one or more of the modules to the production plant at predetermined plant points;

employing a plurality of conductors to establish the intramodule connections;

employing a plurality of cables having a plurality of conductors to establish the intermodule and plant connections through cable connection points;

testing the control system equipment at the factory site, such testing including the combined testing of the control system equipment interconnected by the intermodule cable connections;

preparing the loaded building modules for transportation to the plant installation site including disconnecting the intermodule and any test connections at the cable connection points;

transporting the modules to the plant site;

and installing the modules and establishing the cable connections from the modules to the plant points and reestablishing the intermodules cable connection.

2. A method of building an operating center in accordance with claim 1 and further including:

forming each building module as a transportable, room-size, three-dimensional, rectangular, metal frame structure;

and securing permanent closure means to and closing the roof and floor and some but not all sides of the frame structure, any side not so closed being one that will abut another module in forming a complete operating center building.

3. A method of building an operating center in accordance with claim 2 wherein the preparing of the loaded building modules for transportation to the installation site includes the securing of temporary closure means to the sides of the building modules not closed by permanent closure means thereby enabling the building module to be its own shipping container for the housed control equipment.

4. A method of building an operating center for a production plant as set forth in claim 1 and further including:

housing the control equipment units in cabinets and securing the cabinets to a floor of the operating center in cabinet rows which cross through the interfacing sides of adjacent building modules.

5. A method of building an operating center for a production plant as set forth in claim 4 and further including:

providing walkways between the cabinet rows and providing intramodule connections between cabinets in different rows through cables housed in cable trays which are supported to extend over and between adjacent cabinet rows.

6. A method of building an operating center as set forth in claim 4 and further including: disposing a connector panel in at least one cabinet row near the module side interface to provide intermodule cable connection points.

7. A method of building an operating center for a production plant as set forth in claim 1 and further including:

housing the control equipment units in cabinets and arranging the cabinets in rows with digital units, analog units and operator control units arranged in respective groupings.

8. A method of building an operating center as set forth in claim 7 and further including: generally organizing the cabinet units so that each of most of the units contains equipment associated with a major plant component placed under control or monitor operation.

9. A method of building an operating center in accordance with claim 1 and further including:
employing an electronic simulator to simulate the plant operation;
applying output test signals from the simulator to the equipment units;
and applying signals from the equipment units to the simulator.

10. A method of building an operating center in accordance with claim 9 and further including:
applying test signals from the control equipment units to the simulator through the module plant cable connections.

11. A method of building an operating center for a production plant as set forth in claim 1 and further including:
providing each building module with vertical sidewall beams prior to assembly with each other and removing predetermined ones of said beams from the interfacing sides of assembled modules.

12. A method of building an operating center in accordance with claim 1 wherein each loaded building module is separately transported to the installation site by lifting same onto a truck trailer and hauling the loaded trailer to the installation site by a tractor type truck unit.

13. A method of building an operating center in accordance with claim 1 wherein the installing of the loaded building modules at the installation site includes joining the building modules together to form an integral weatherproofed building structure.

14. A method of building an electrical operating center as set forth in claim 1 wherein the plant is an electrical power generating plant
which employs steam to drive at least one prime mover and the plant cables provide for operating center connections to the plant equipment including prime mover equipment and steam generation equipment.

15. A method of building an operating center for an electric power plant as set forth in claim 14 wherein the power plant is a combined cycle plant having at least one gas turbine and one steam tubine and a steam generator.

16. A method of building an electrical operating center for a power plant in accordance with claim 14 wherein the electrical control system equipment includes programmable digital computer equipment for monitoring and/or controlling the operation of the plant power generating equipment.

17. A method of building
an electrical operating center for a power plant in accordance with claim 14 and further including:
forming each building module as a transportable, room-size, three dimensional, rectangular, metal frame structure;
and securing permanent closure means to and closing the roof and floor and some but not all sides of the frame structure, any side not so closed being one that will abut another module in forming a complete operating center building.

18. A method of building an electrical operating center for a power plant in accordance with claim 14 and further including:
securing of temporary closure means to the sides of the building modules not closed by permanent closure means thereby enabling the building module to be its own shipping container for the housed control equipment.

19. A method of building an electrical operating center for a power plant in accordance with claim 14 and further including:
housing the control equipment units in cabinets and securing the cabinets to a floor of the operating center in cabinet rows which cross through the interfacing sides of adjacent building modules.

20. A method of building an electrical operating center for a power plant in accordance with claim 19 and further including:
providing walkways between the cabinet rows and providing intramodule connections between cabinets in different rows through cables housed in cable trays which are supported to extend over and between adjacent cabinet rows.

21. A method of building of electrical operating center for a power plant in accordance with claim 19 and further including:
disposing a connector panel in at least one cabinet row near the module side interface to provide intermodule cable connection points.

22. A method of building an electrical operating center for a power plane in accordance with claim 14 and further including:
housing the control equipment units in cabinets and arranging the cabinets in rows with digital units, analog units and operator control units arranged in respective groupings.

23. A method of building an electrical operating center for a power plant in accordance with claim 22 and further including:
generally organizing the cabinet units so that each of most of the units contains equipment associated with a major plant component placed under control or monitor operation.

24. A method of building an electrical operating center for a power plant in accordance with claim 14 and further including:
employing an electronic simulator to simulate the plant operation;
applying output test signals from the simulator to the equipment units;
and applying signals from the equipment units to the simulator.

25. A method of building an electrical operating center for a power plant in accordance with claim 24 and further including:
applying test signals from the control equipment units to the simulator through the module plant cable connections.

26. A method of building an electrical operating center for a power plant in accordance with claim 24 and further including:
securing of temporary closure means to the sides of the building modules not closed by permanent closure means thereby enabling the building module to be its own shipping container for the housed control equipment;
housing the control equipment units in cabinets and securing the cabinets to a floor of the operating center in cabinet rows which cross through the interfacing sides of adjacent building modules.

27. A method of building an electrical operating center for a power plant in accordance with claim 24 and further including:
providing walkways between the cabinet rows and providing intramodule connections between cabinets in different rows through cables housed in cable trays which are supported to extend over and between adjacent cabinet rows.

28. A method of building an electrical operating center for a power plant in accordance with claim 24 and further including:
joining the building modules together to form an integral weatherproofed building structure at the power plant site, and connecting power plant cables from the module plant connecting points to the plant equipment including the plant prime mover and steam generation equipment.

29. A method of building an operating center for an electric power plant as set forth in claim 24 wherein the power plant is a combined cycle plant having at least one gas turbine and one steam turbine and a steam generator.

30. Apparatus for a prefabricated operating center for an industrial plant, process or system comprising:
a plurality of transportable room-size building modules each including a three-dimensional, rectangular metal frame structure and being adapted to be transported to and joined together at an industrial installation site to form a unitary operating center building;
electrical control system equipment items for use in monitoring and/or controlling the operation of a plant designed to produce goods or services, some of which control system equipment items are installed in one of the building modules and other of which control system equipment items are installed in another of the building modules before shipment to the installation site;
a plurality of conductors for establishing predetermined connections between equipment items in the same module;
a plurality of cables having plural conductors for establishing predetermined connections between equipment items in different modules and between equipment items and the plant equipment; and
connection means for connecting and disconnecting intermodule and module-plant cable connections to enable factory site testing of the control equipment items while cable connections are established and to enable separation of the modules for shipment to the plant site,
and means for applying plant simulation test signals to the control system items at the factory site, said test means being detached from said modules prior to module shipment.

31. Apparatus for an operating center as set forth in claim 30 wherein permanent closure means is secured to and closes the roof and floor and some but not all sides of the frame structure, any side not so closed being one that will abut another module in forming the complete operating center building, and temporary closure means secured to the open module sides when the modules are separated for shipment.

32. Apparatus for an operating center as set forth in claim 25 wherein the control equipment units are housed in cabinets secured to the module flooring and arranged in rows which cross through the interfacing sides of adjacent building modules.

33. Apparatus for an operating center as set forth in claim 32 wherein walkways are provided between the cabinet rows and cable trays are supported over the cabinets to support cables carrying conductors for connections between equipment items in different cabinet rows.

34. A prefabricated operating center as set forth in claim 30 wherein the plant is an electric power generating plant which employs steam to drive at least one prime mover and the plant cables provide for operating center connections to the plant equipment including prime mover equipment and steam generation equipment.

35. An electric power generating plant comprising:
electric generator equipment for producing electricity;
turbine equipment for driving the generator equipment;
at least one steam generator for producing motive steam for at least some of said turbine equipment;
a plurality of transportable room-size building modules installed at the plant site to form a unitary control center building;
control system equipment for monitoring and controlling the operation of at least the generator and turbine equipment, such control system equipment being installed within the building modules before shipment of the building modules to the plant site;
connector cables for connecting the control system equipment to the generator and turbine equipment;
connector cables for making predetermined connections between control system equipment items in different building modules;
and means for applying plant simulation test signals to the control system items at the factory site, said test means being detached from said modules prior to module shipment.

36. Apparatus for a power plant as set forth in claim 35 wherein the plant is a combined cycle plant having at least one gas turbine and one steam turbine and steam generator equipment and the plant cables further provide predetermined connections from the control equipment items to the stem generator equipment.

* * * * *